US012769096B2

(12) United States Patent
Kimura

(10) Patent No.: US 12,769,096 B2
(45) Date of Patent: Oct. 20, 2026

(54) ZOOM LENS AND IMAGE PICKUP APPARATUS

(71) Applicant: CANON KABUSHIKI KAISHA, Tokyo (JP)

(72) Inventor: Kohei Kimura, Saitama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 169 days.

(21) Appl. No.: 18/928,515

(22) Filed: Oct. 28, 2024

(65) Prior Publication Data

US 2025/0164760 A1 May 22, 2025

(30) Foreign Application Priority Data

Nov. 17, 2023 (JP) ................................ 2023-195626

(51) Int. Cl.
*G02B 13/00* (2006.01)
*G02B 15/14* (2006.01)

(52) U.S. Cl.
CPC ....... *G02B 13/009* (2013.01); *G02B 15/1461* (2019.08)

(58) Field of Classification Search
CPC .............. G02B 13/009; G02B 15/1461; G02B 15/144113; G02B 15/173
See application file for complete search history.

(56) References Cited

U.S. PATENT DOCUMENTS

2022/0214530 A1* 7/2022 Nakahara ........... G02B 13/0045

FOREIGN PATENT DOCUMENTS

JP 2009086537 A 4/2009
JP 6690425 B2 4/2020

* cited by examiner

*Primary Examiner* — Charles S Chang
(74) *Attorney, Agent, or Firm* — ROSSI, KIMMS & McDOWELL LLP

(57) ABSTRACT

A zoom lens includes, in order from an object side to an image side, a first lens unit having positive refractive power that does not move during zooming, a second lens unit having negative refractive power that moves during zooming, and a subsequent lens group including one or more lens units. A distance between adjacent lens units changes during zooming. The first lens unit includes four or fewer lenses. Predetermined inequalities are satisfied.

20 Claims, 11 Drawing Sheets

ZOOM LENS AND IMAGE PICKUP APPARATUS

BACKGROUND

Technical Field

The present disclosure relates to a zoom lens for an image pickup apparatus, etc.

Description of Related Art

Image pickup apparatuses such as digital still cameras and video cameras are demanded to have high resolution over the entire zoom range, and a reduced overall length, barrel diameter, and weight. They are also demanded to suppress various aberrations on the telephoto side. As a positive lead type zoom lens that meets these requirements, Japanese Patent No. 6690425 discloses a zoom lens that includes a first lens unit having positive refractive power, a second lens unit having negative refractive power, a third lens unit having positive refractive power, a fourth lens unit having positive refractive power, and a fifth lens unit having negative refractive power, wherein the first lens unit moves during zooming. Japanese Patent Laid-Open No. 2009-086537 discloses a zoom lens that includes a first lens unit having positive refractive power, a second lens unit having negative refractive power, a third lens unit having positive refractive power, and a fourth lens unit having positive refractive power, wherein the first lens unit is fixed during zooming.

SUMMARY

A zoom lens according to one aspect of the disclosure includes, in order from an object side to an image side, a first lens unit having positive refractive power that does not move during zooming, a second lens unit having negative refractive power that moves during zooming, and a subsequent lens group including one or more lens units. A distance between adjacent lens units changes during zooming. The first lens unit includes four or fewer lenses. The following inequalities are satisfied:

$$3.1 \leq D2/TG2 \leq 10$$

$$-20.0 \leq ft/f2 \leq -6.8$$

where D2 is a thickness on an optical axis from a surface closest to an object of the second lens unit to a surface closest to an image plane of the second lens unit, TG2 is a sum of thicknesses on the optical axis from a surface closest to the object of one or more lenses included in the second lens unit to a surface closest to the image plane of the one or more lenses included in the second lens unit, ft is a focal length of the zoom lens at a telephoto end, and f2 is a focal length of the second lens unit. An image pickup apparatus having the above zoom lens also constitutes another aspect of the disclosure.

Further features of various embodiments of the disclosure will become apparent from the following description of embodiments with reference to the attached drawings.

DETAILED DESCRIPTION

Referring now to the accompanying drawings, a description will be given of examples according to the disclosure.

A zoom lens for an image pickup apparatus is demanded to have a reduced overall length, barrel diameter, and size, and a high zoom ratio and optical performance over the entire zoom range and all object distances. In particular, the zoom lens is demanded to suppress chromatic aberration at the telephoto end, reduce the overall length of the zoom lens, and suppress the weight and moving amount of a moving lens unit.

In order to satisfy these requirements, it is important for a positive lead type zoom lens to properly set the configuration of each lens unit in the zoom lens. In particular, it is important to properly set the configuration and refractive power of the second lens unit so as to satisfactorily suppress aberrations over the entire zoom range while the weight of the second lens unit as a primary magnification varying unit is reduced.

The zoom lens according to each example includes, in order from the object side to the image side, a first lens unit having positive refractive power, a second lens unit having negative refractive power, and a subsequent lens unit including one or more lens units. During zooming (magnification variation), the first lens unit does not move (i.e., is fixed) and the second lens unit moves.

In a zoom lens, a lens unit is a group of one or more lenses that integrally move during zooming between the wide-angle end and the telephoto end. That is, a distance between adjacent lens units changes during zooming. The lens unit may include an aperture stop (diaphragm). The wide-angle end and the telephoto end respectively are zoom states of a maximum angle of view (minimum focal length) and a minimum angle of view (maximum focal length) when the lens unit that moves during zooming is located at both ends of a mechanically or controllably movable range on the optical axis.

Figure 1:
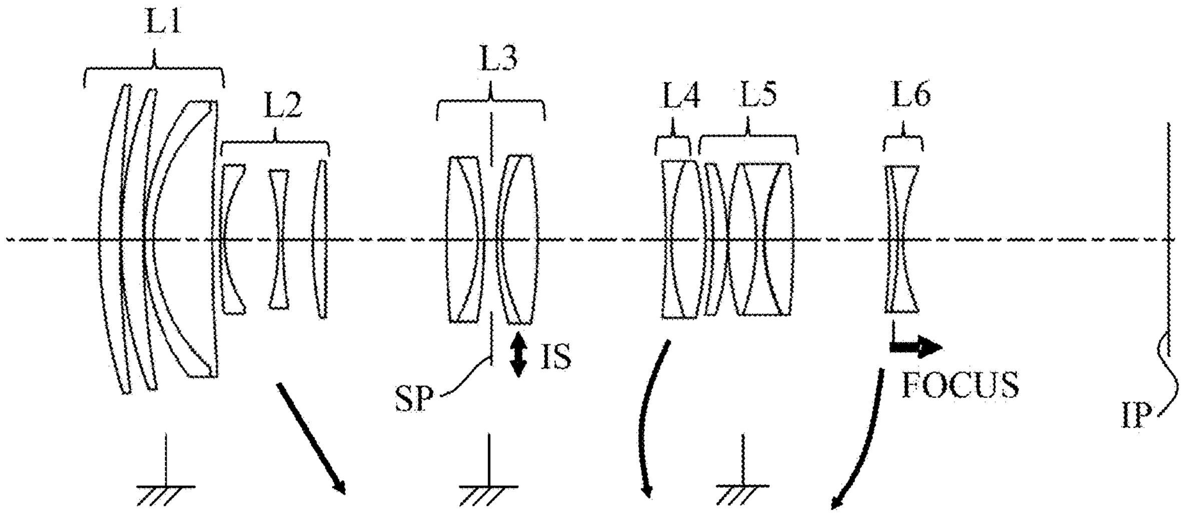
FIG. 1 illustrates a sectional view of a zoom lens according to Example 1.
Figure 2A:
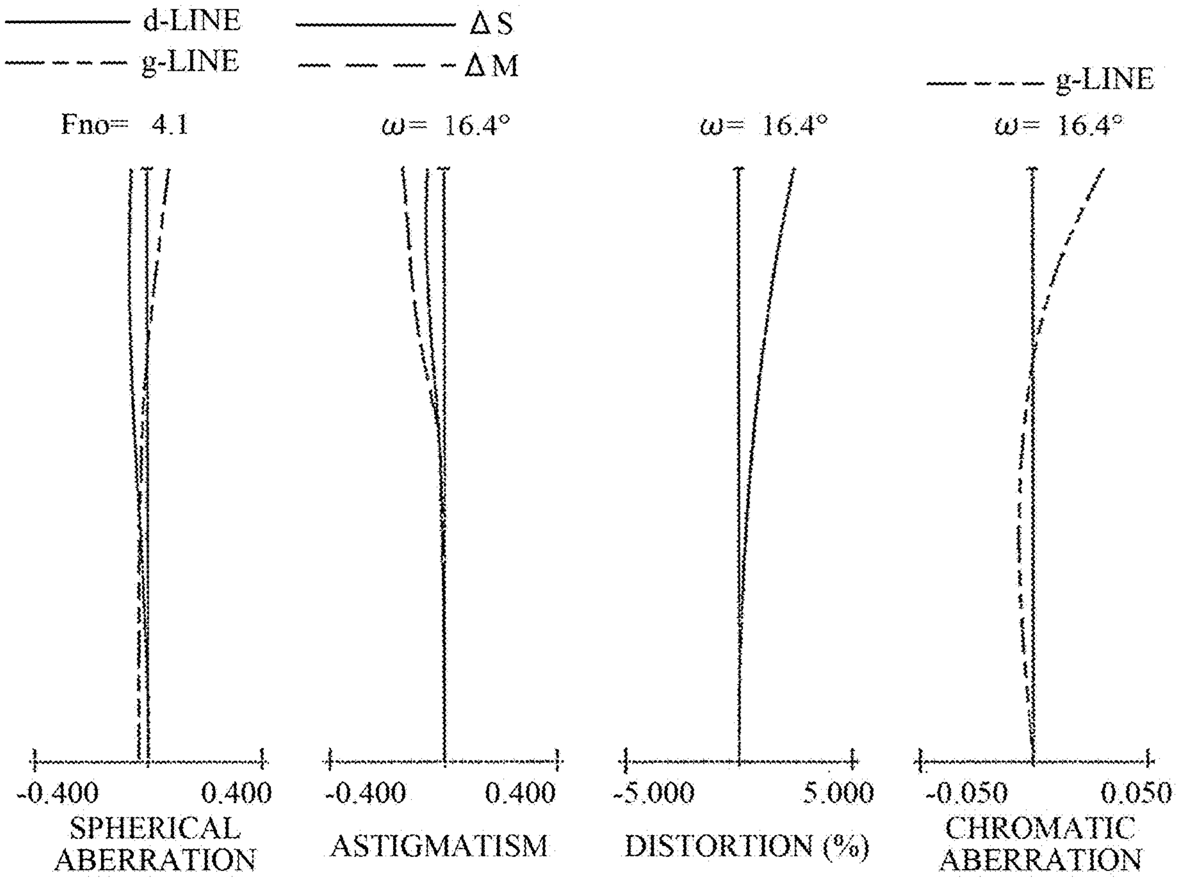
FIGS. 2A, 2B, and 2C are aberration diagrams of the zoom lens according to Example 1 at a wide-angle end, an intermediate zoom position, and a telephoto end, respectively.
Figure 2B:
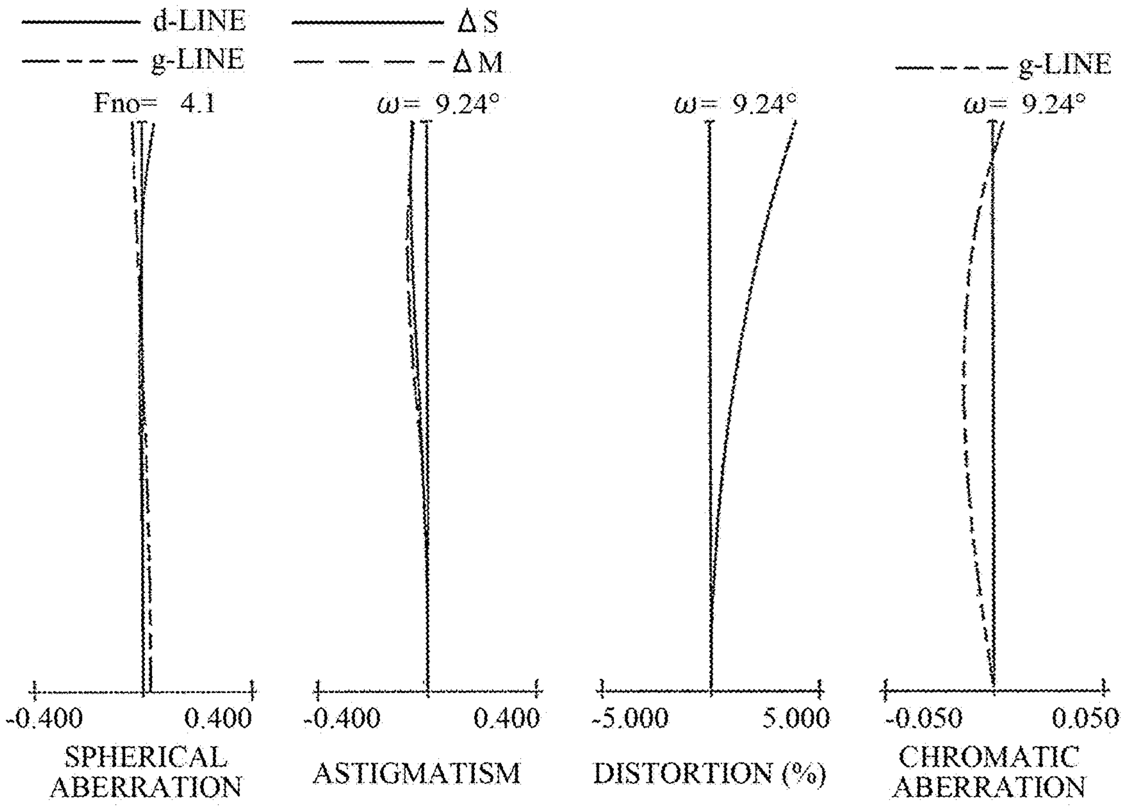
Figure 2C:
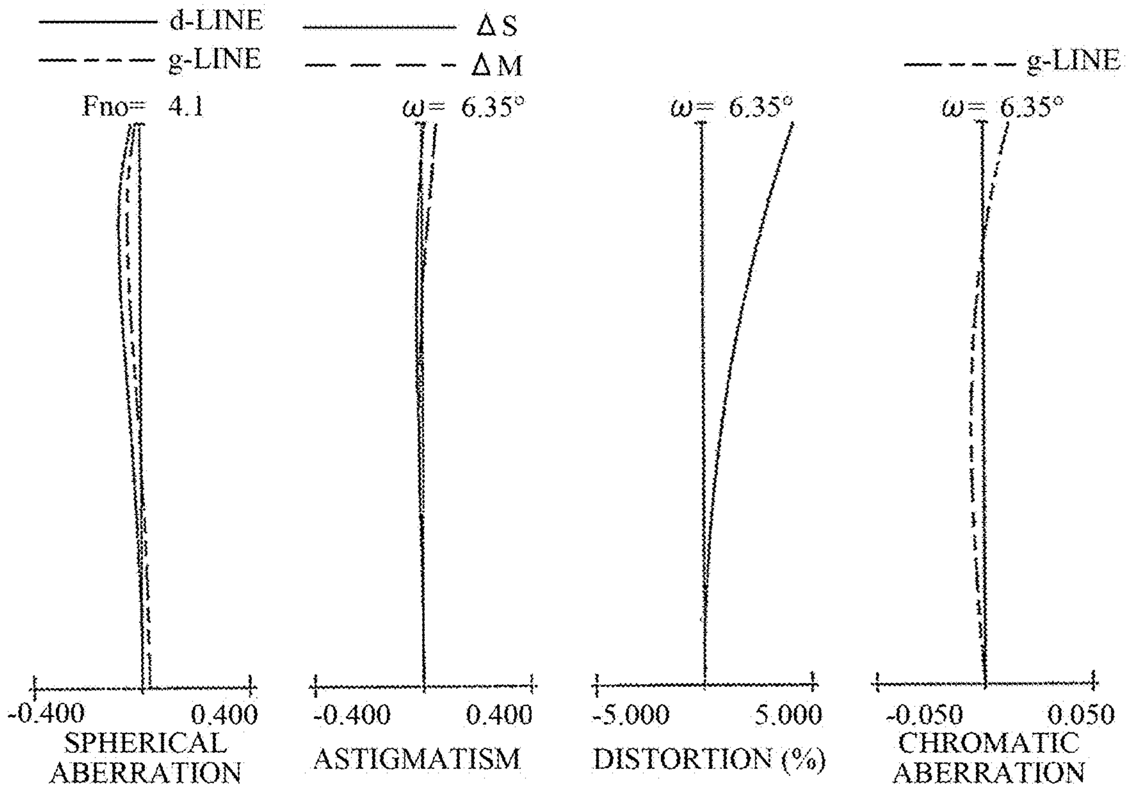

FIG. 1 illustrates the configuration of a zoom lens according to Example 1 at a wide-angle end. FIGS. 2A, 2B, and 2C respectively illustrate longitudinal aberrations (spherical aberration, astigmatism, distortion, and chromatic aberration) of the zoom lens according to numerical example 1 corresponding to Example 1 at the wide-angle end, an intermediate zoom position, and a telephoto end. The zoom lens according to numerical example 1 has a zoom ratio of 2.6 and an F-number of about 4.1.

Figure 3:
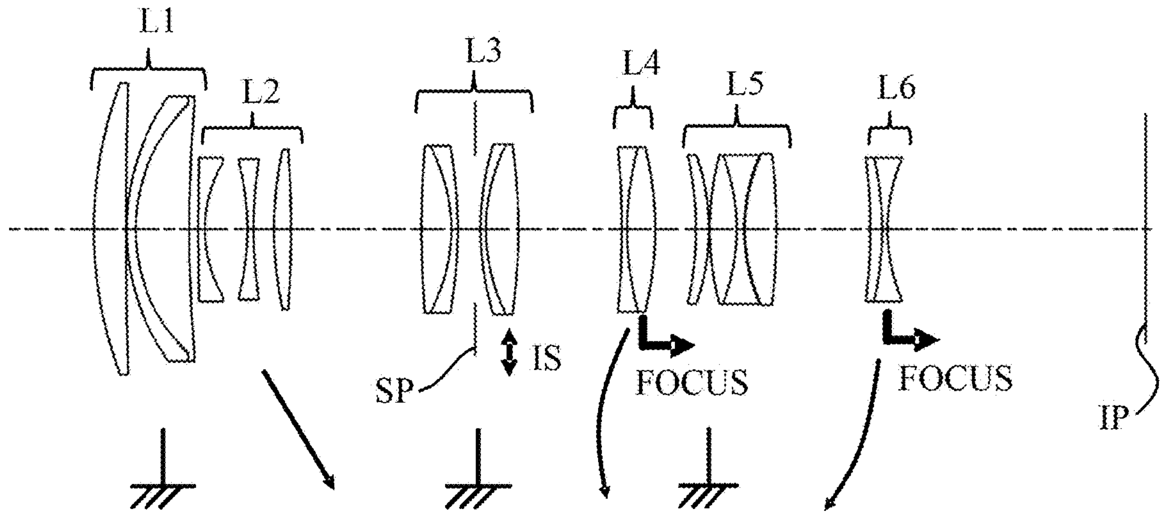
FIG. 3 illustrates a sectional view of a zoom lens according to Example 2.
Figure 4A:
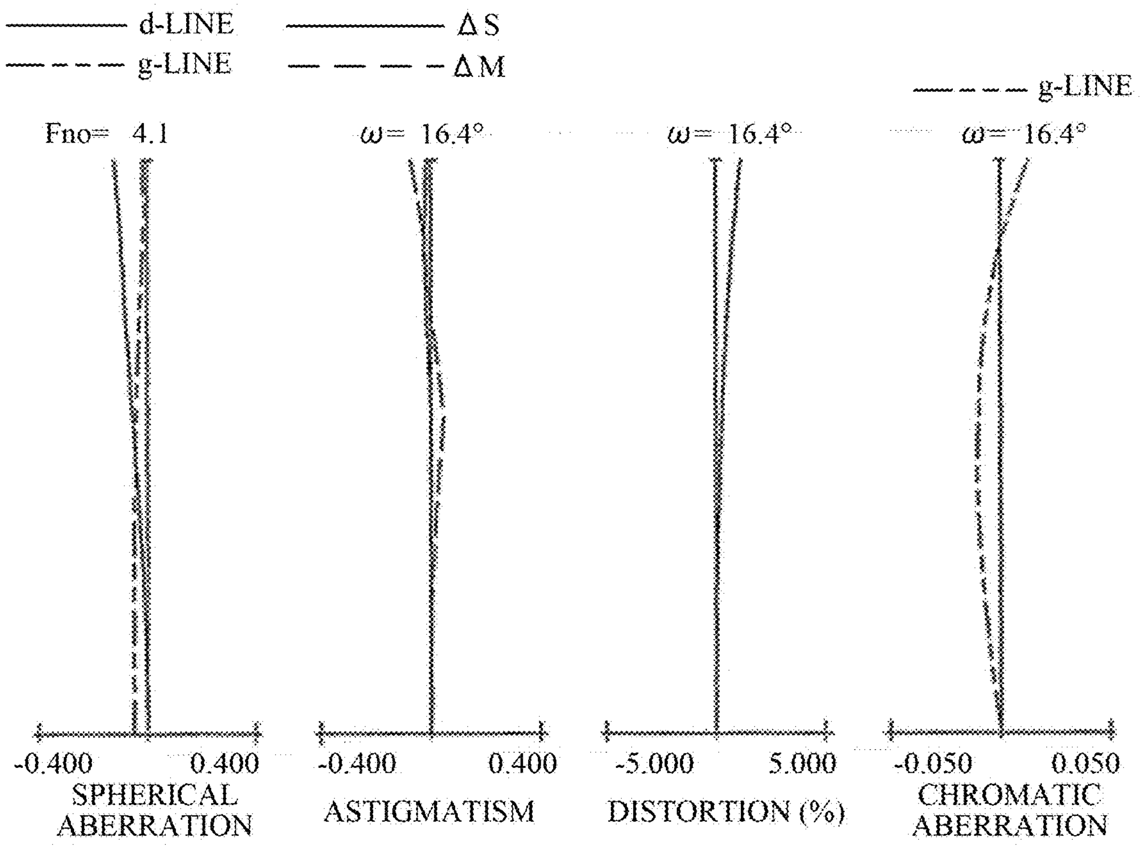
FIGS. 4A, 4B, and 4C are aberration diagrams of the zoom lens according to Example 2 at a wide-angle end, an intermediate zoom position, and a telephoto end, respectively.
Figure 4B:
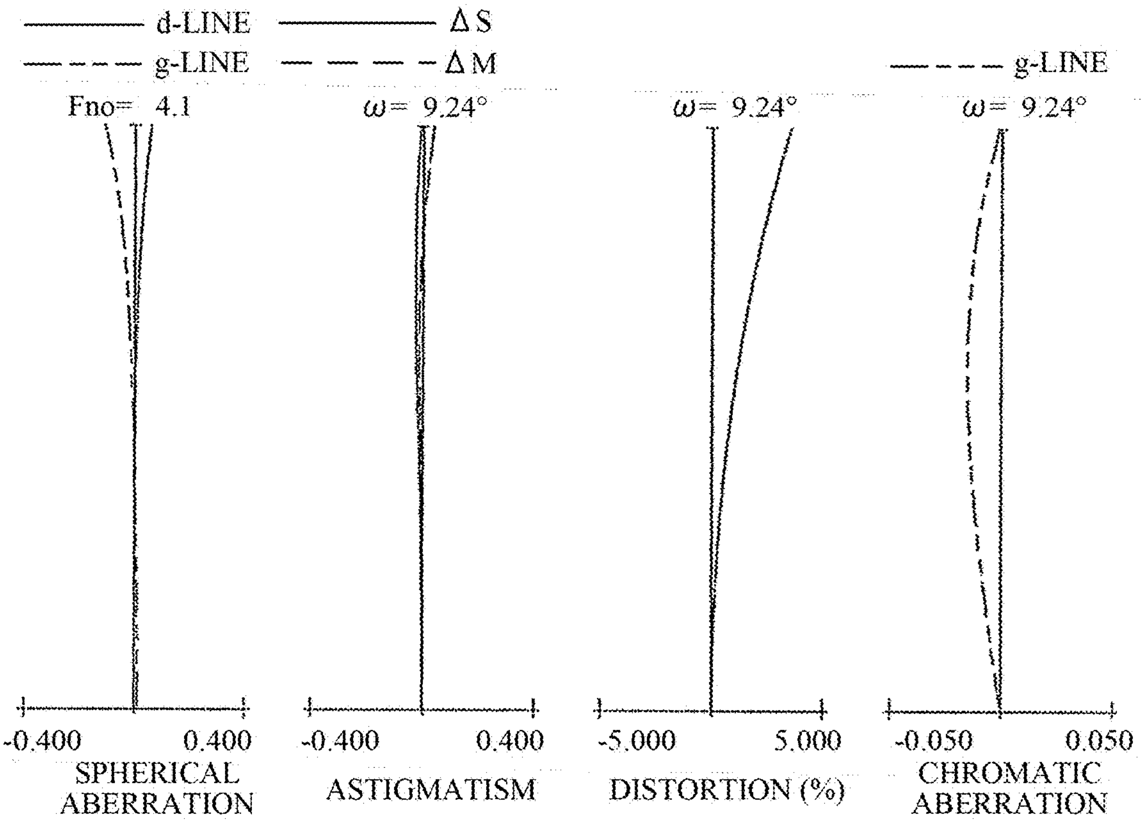
Figure 4C:
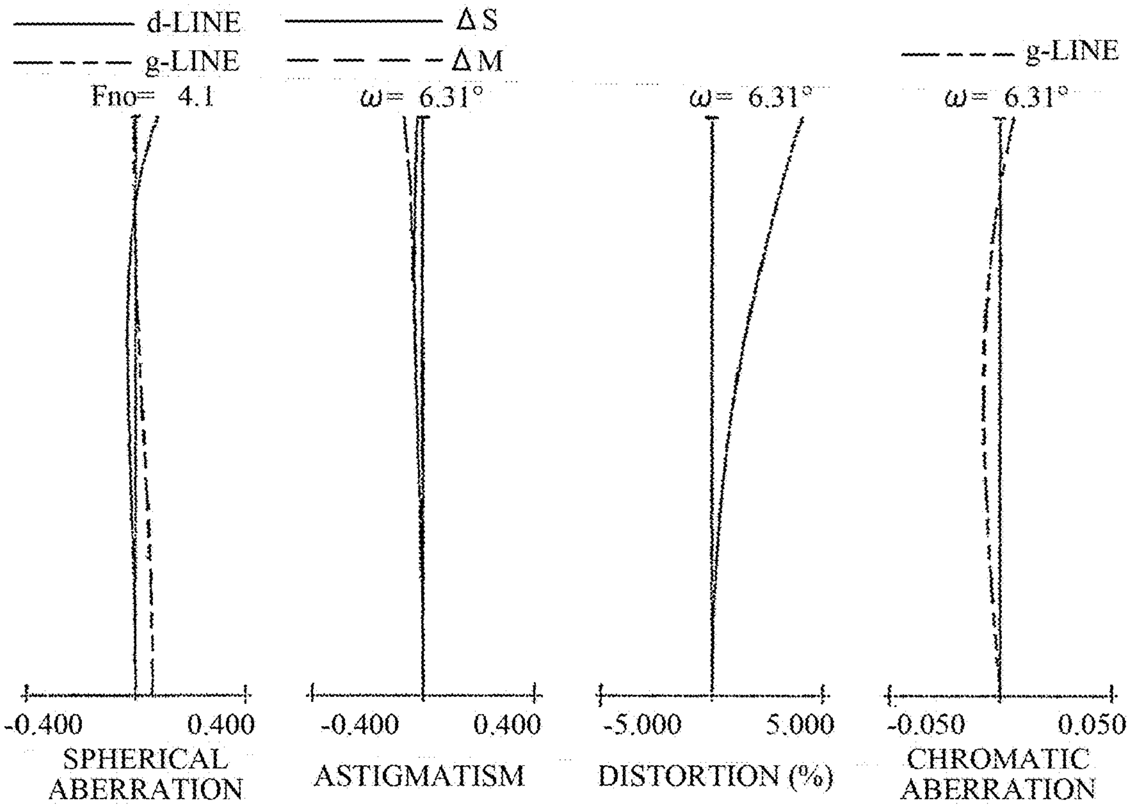

FIG. 3 illustrates the configuration of a zoom lens according to Example 2 at a wide-angle end. FIGS. 4A, 4B, and 4C respectively illustrate longitudinal aberrations of the zoom lens according to numerical example 2 corresponding to Example 2 at the wide-angle end, an intermediate zoom position, and a telephoto end. The zoom lens according to numerical example 2 has a zoom ratio of about 2.7 and an F-number of about 4.1.

Figure 5:
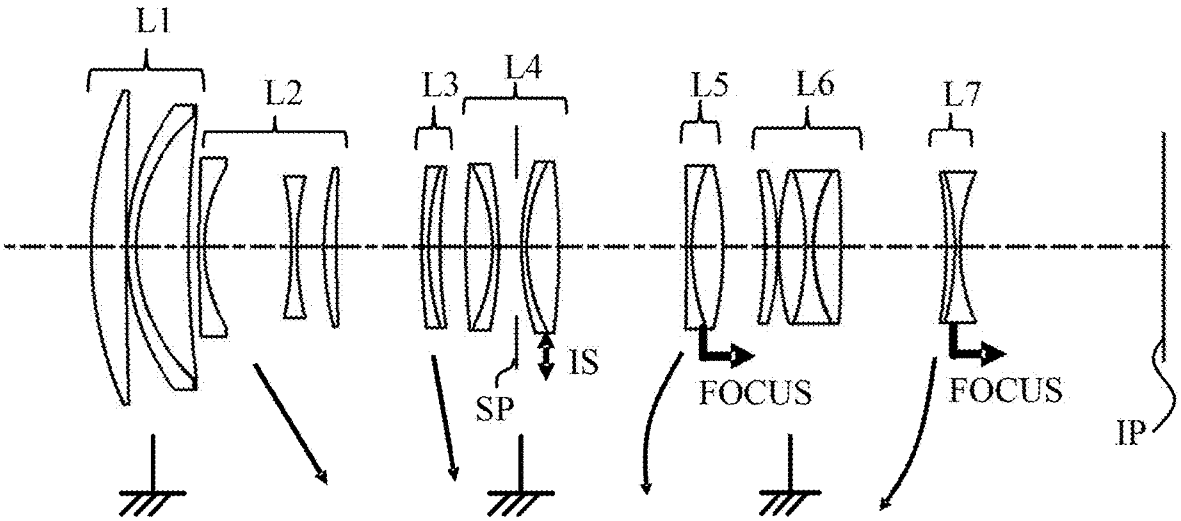
FIG. 5 illustrates a sectional view of a zoom lens according to Example 3.
Figure 6A:
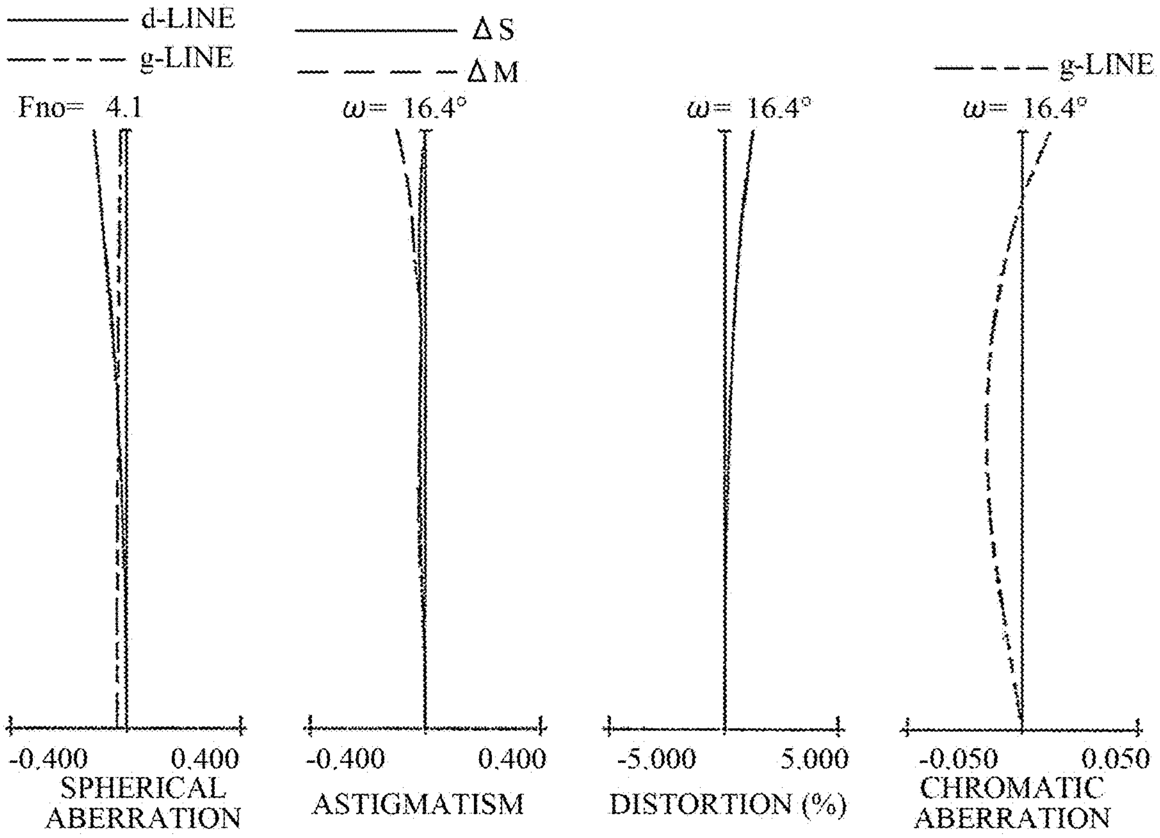
FIGS. 6A, 6B, and 6C are aberration diagrams of the zoom lens according to Example 3 at a wide-angle end, an intermediate zoom position, and a telephoto end, respectively.
Figure 6B:
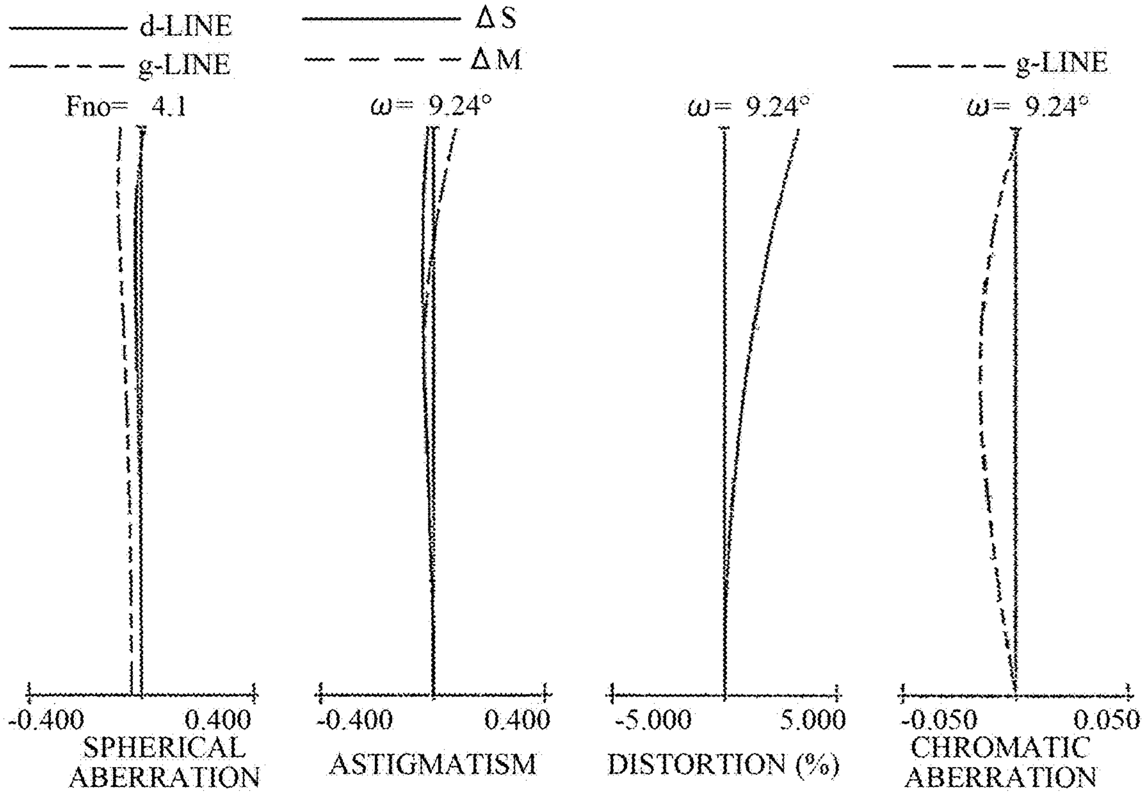
Figure 6C:
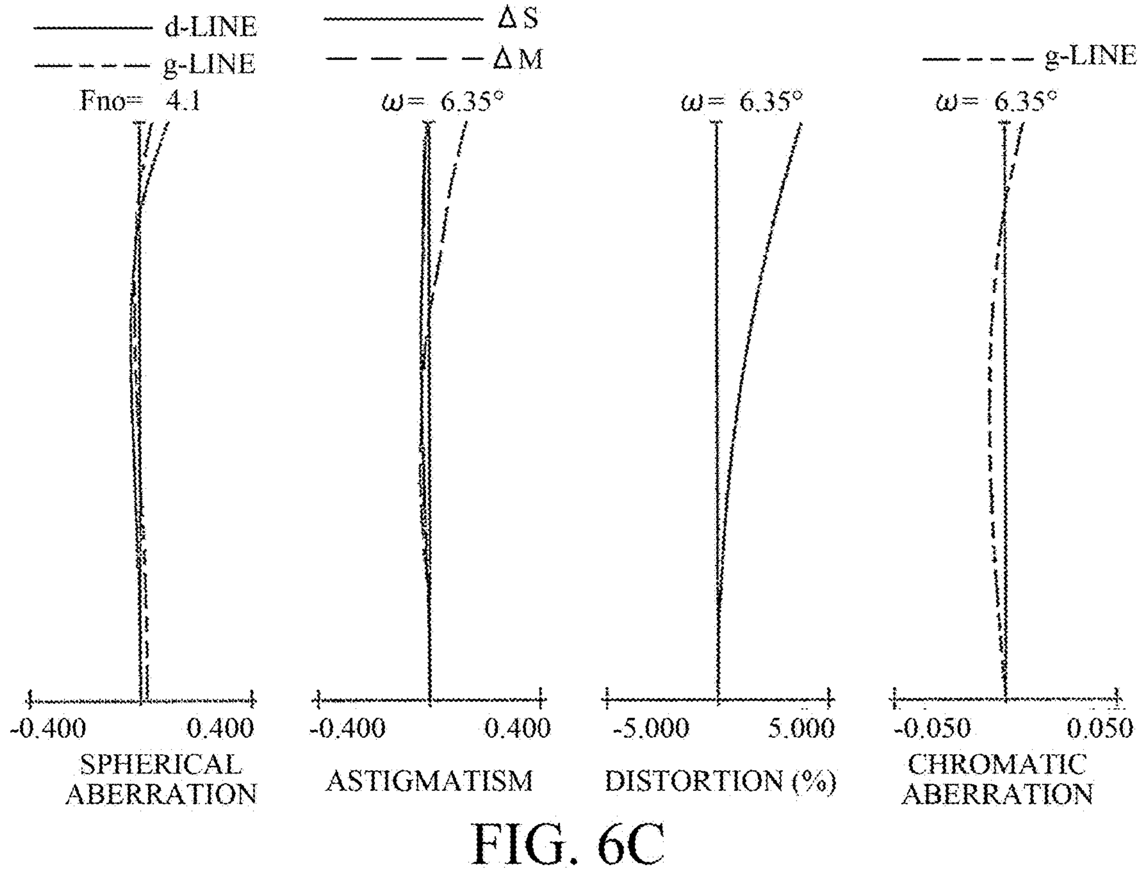

FIG. 5 illustrates the configuration of a zoom lens according to Example 3 at a wide-angle end. FIGS. 6A, 6B, and 6C respectively illustrate longitudinal aberrations of the zoom lens according to numerical example 3 corresponding to Example 3 at the wide-angle end, an intermediate zoom position, and a telephoto end. The zoom lens according to numerical example 3 has a zoom ratio of about 2.6 and an F-number of about 4.1.

Figure 7:
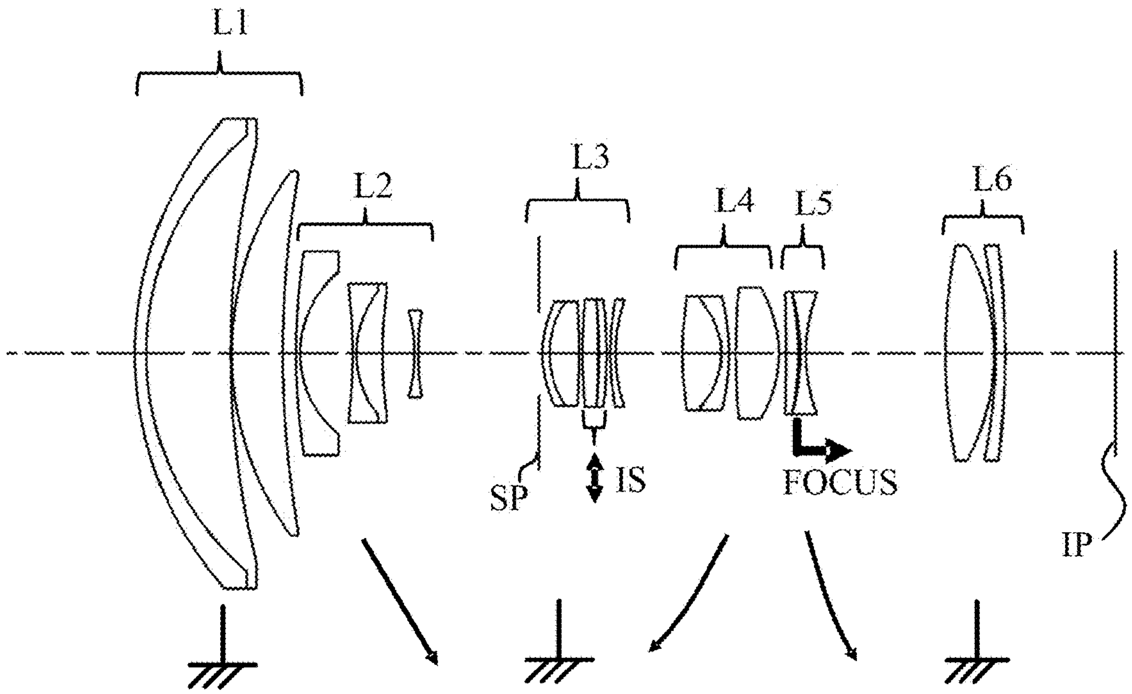
FIG. 7 illustrates a sectional view of a zoom lens according to Example 4.
Figure 8A:
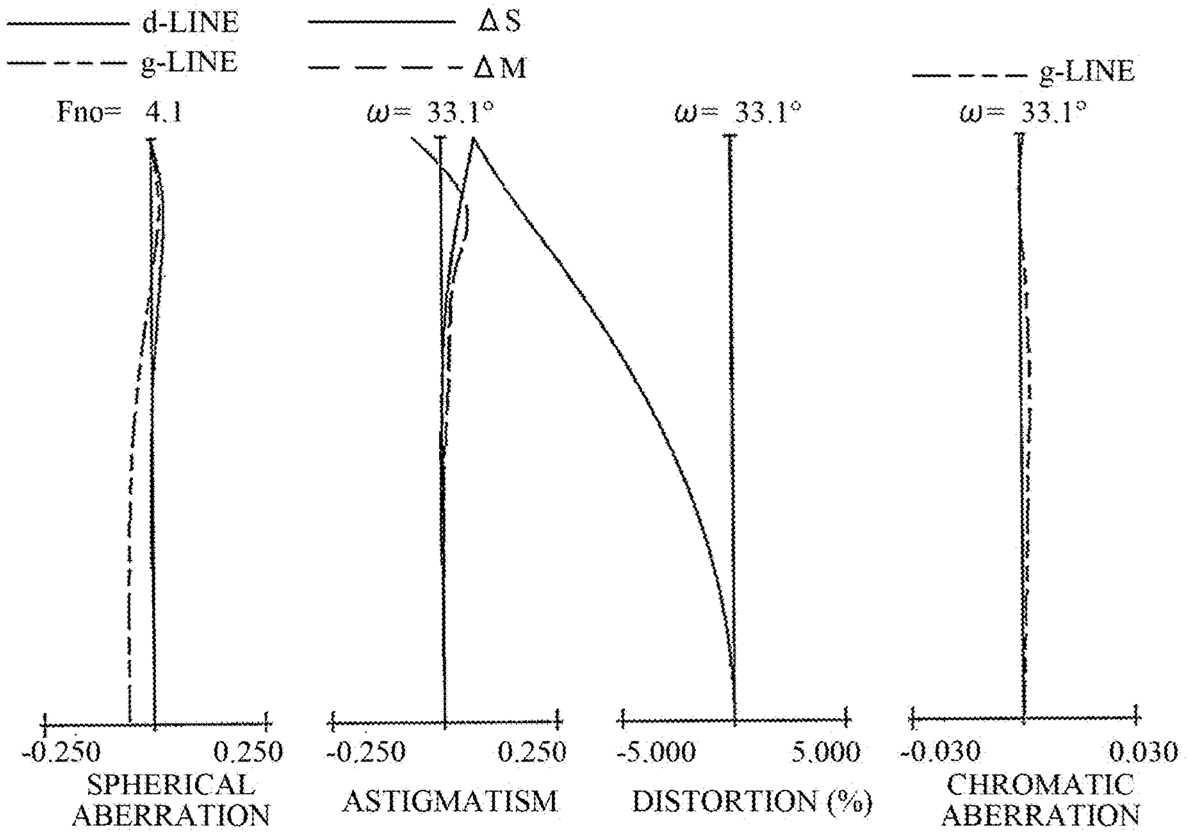
FIGS. 8A, 8B, and 8C are aberration diagrams of the zoom lens according to Example 4 at a wide-angle end, an intermediate zoom position, and a telephoto end, respectively.
Figure 8B:
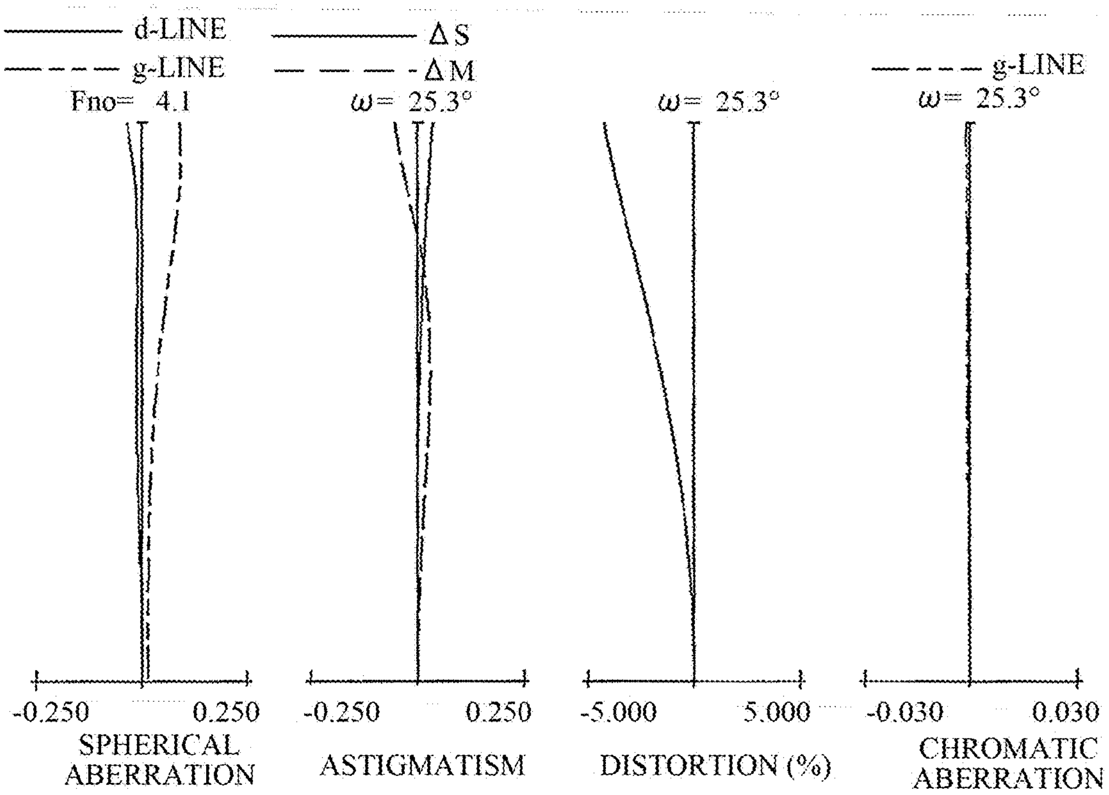
Figure 8C:
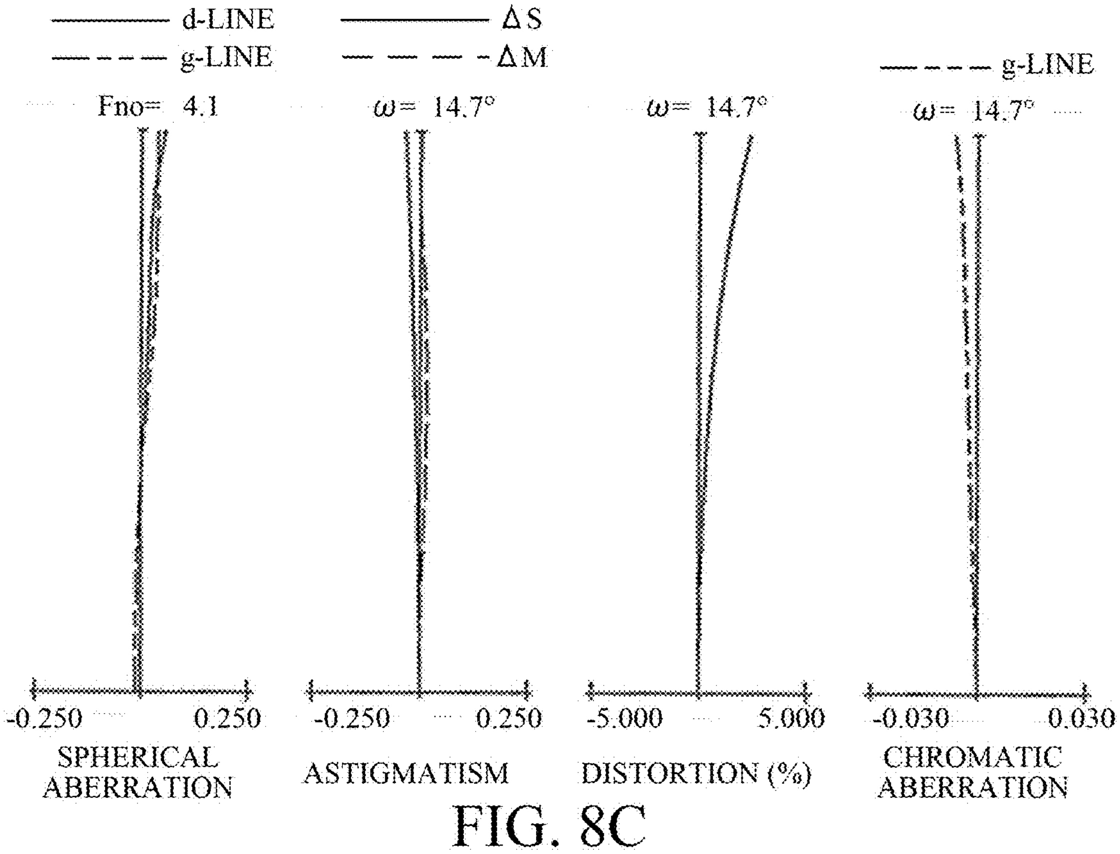

FIG. 7 illustrates the configuration of a zoom lens according to Example 4 at a wide-angle end. FIGS. 8A, 8B, and 8C respectively illustrate longitudinal aberrations of the zoom lens according to numerical example 4 corresponding to Example 4 at the wide-angle end, an intermediate zoom position, and a telephoto end. The zoom lens according to numerical example 4 has a zoom ratio of about 2.8 and an F-number of about 4.1.

Figure 9:
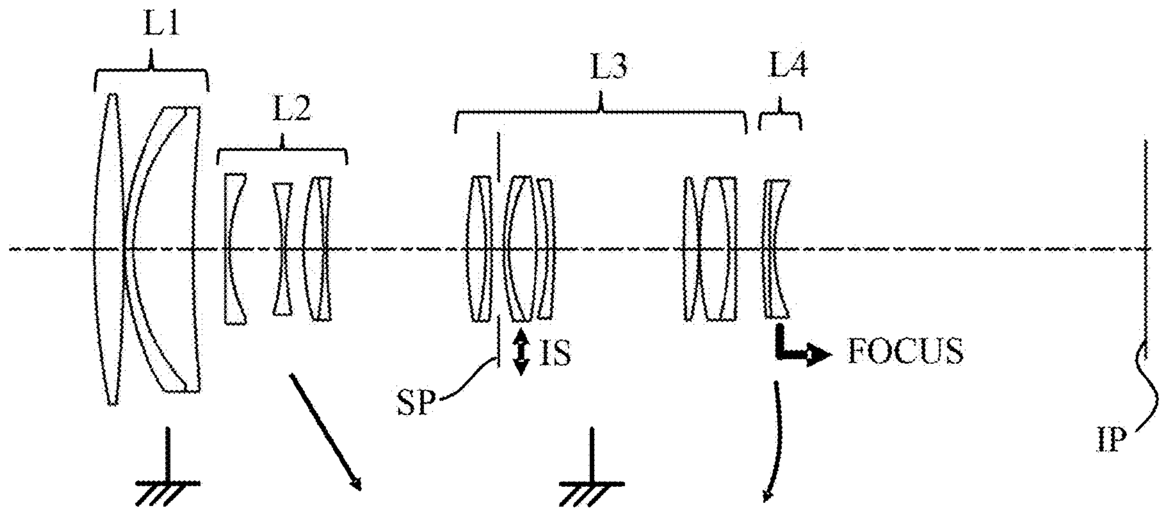
FIG. 9 is a sectional view of a zoom lens according to Example 5.
Figure 10A:
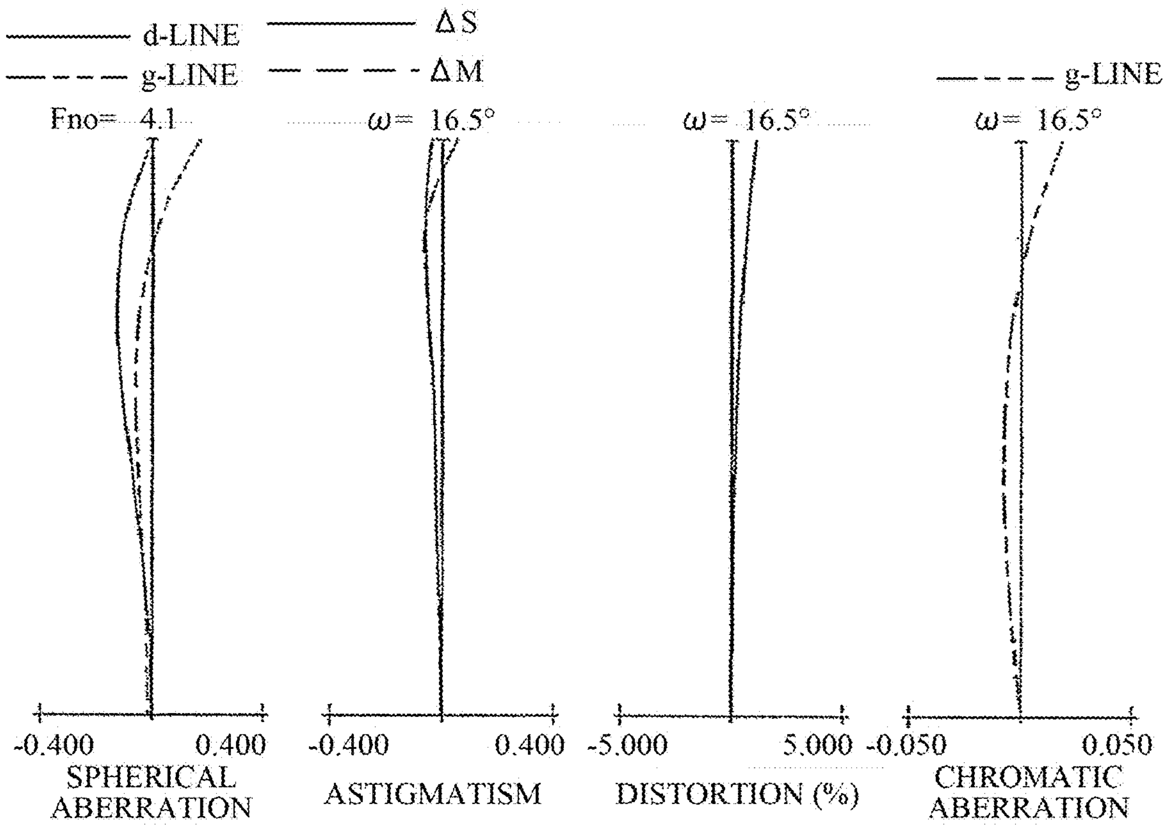
FIGS. 10A, 10B, and 10C are aberration diagrams of the zoom lens according to Example 5 at a wide-angle end, an intermediate zoom position, and a telephoto end, respectively.
Figure 10B:
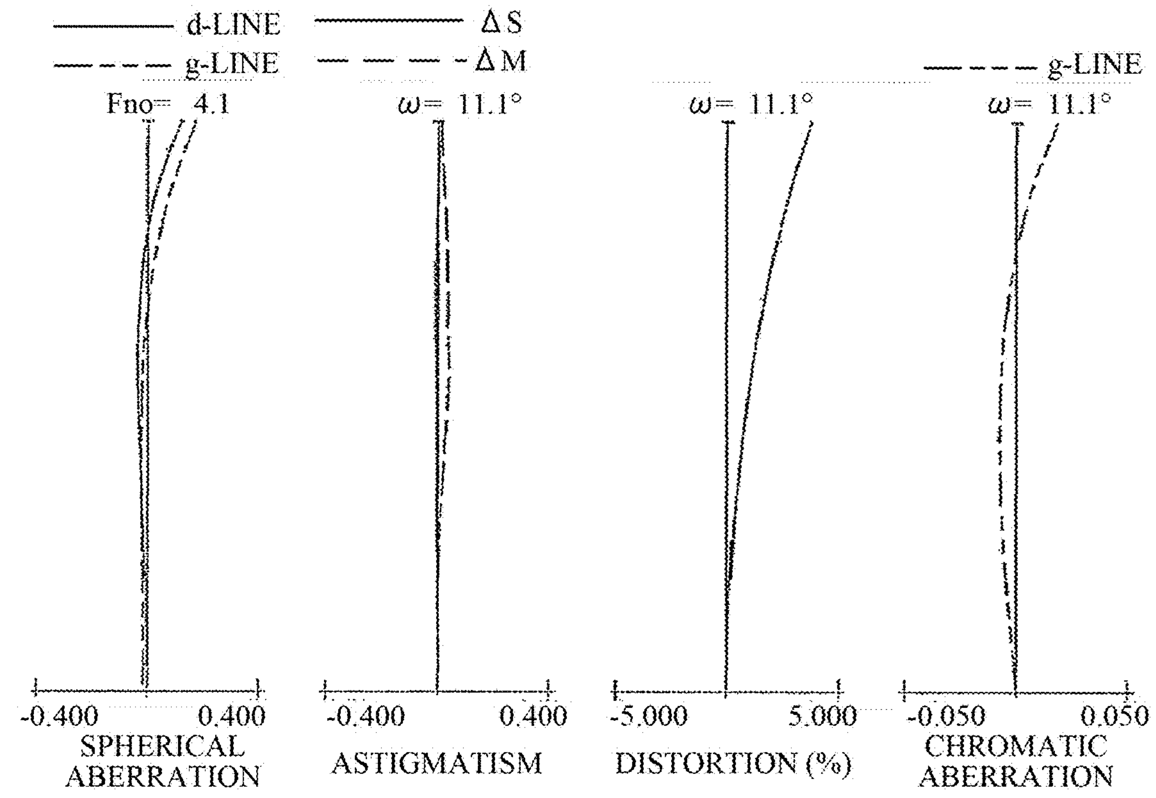
Figure 10C:
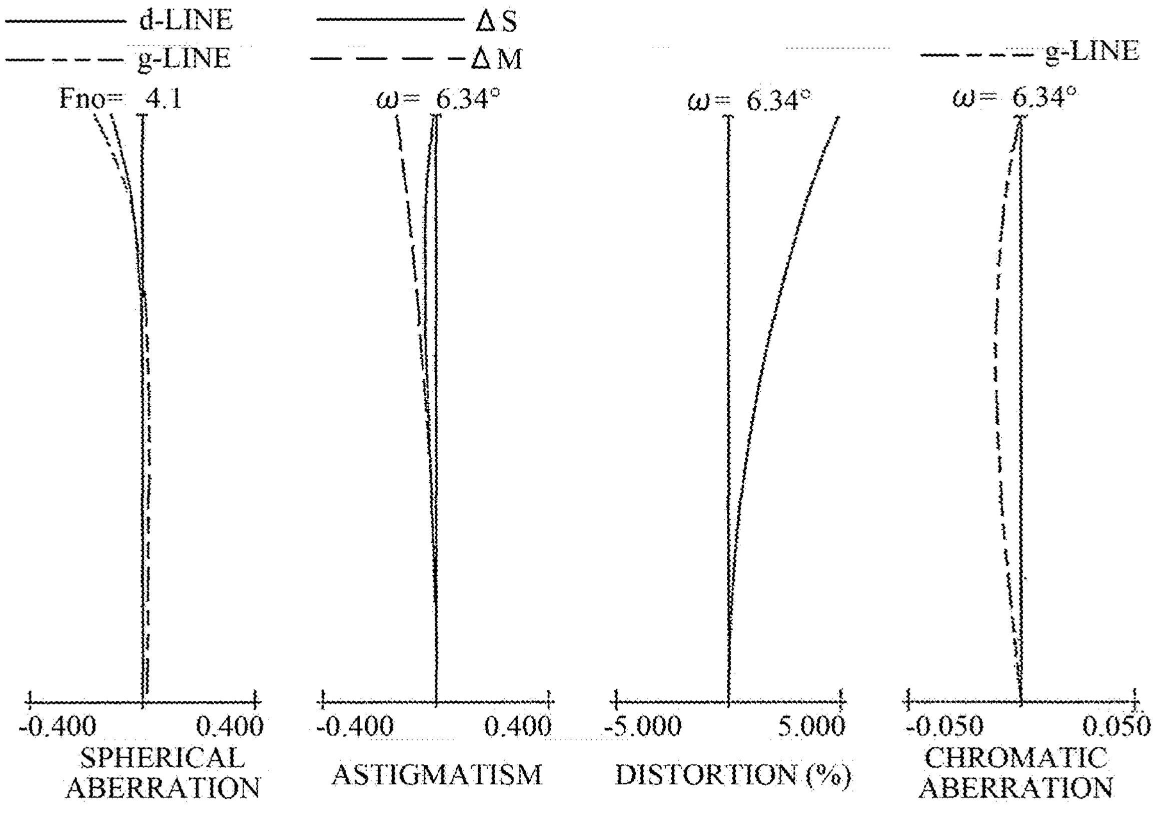

FIG. 9 illustrates the configuration of a zoom lens according to Example 5 at a wide-angle end. FIGS. 10A, 10B, and 10C respectively illustrate longitudinal aberrations of the zoom lens according to numerical example 5 corresponding to Example 5 at the wide-angle end, an intermediate zoom position, and a telephoto end. The zoom lens according to numerical example 5 has a zoom ratio of 2.7 and an F-number of about 4.1.

The zoom lenses according to each example are used in image pickup apparatuses such as digital cameras, video cameras, broadcasting cameras, surveillance cameras, and film-based cameras. The zoom lenses according to each example can also be used as projection optical systems for image projection apparatuses (projectors).

In FIGS. 1, 3, 5, 7, and 9, a left side is an object side (front side), and a right side is an image side (rear side). In a case where i represents the order of the lens units counted from the object side, Li indicates an i-th lens unit. SP represents an aperture stop. IP represents an image plane. On the image plane IP, an imaging surface (light receiving surface) of an image sensor, which is a photoelectric conversion element such as a CCD sensor or CMOS sensor, or a film surface (photosensitive surface) of a silver film is located.

In each diagram, arrows below lens units that move during zooming illustrate moving loci during zooming from the wide-angle end to the telephoto end. A FOCUS arrow illustrates a moving direction of the lens units that move during focusing from an object at infinity to an object at a close distance. IS represents an image stabilizing unit (shift or correction lens), which moves (shifts) in a direction orthogonal to the optical axis to correct image blur caused by a camera shake such as a handheld shake.

In the spherical aberration diagram among the aberration diagrams, Fno represents an F-number. A solid line illustrates a spherical aberration amount for the d-line (wavelength 587.6 nm), and an alternate long and two short dashes line illustrates a spherical aberration amount for the g-line (wavelength 435.8 nm). In the astigmatism diagram, a solid line S indicates an astigmatism amount on a sagittal image plane, and a dashed line M indicates an astigmatism amount on a meridional image plane. The distortion diagram illustrates a distortion amount for the d-line. The chromatic aberration diagram illustrates a lateral chromatic aberration amount for the g-line. ω represents a half angle of view (°).

A specific description will now be given of the configuration of the zoom lens according to each example. Similarly to the i-th lens unit, a plurality of lenses in each lens unit, which will be described later, are arranged in order from the object side to the image side.

The zoom lens according to Example 1 illustrated in FIG. 1 includes a first lens unit L1 having positive refractive power, a second lens unit L2 having negative refractive power, a third lens unit L3 having positive refractive power, a fourth lens unit L4 having positive refractive power, a fifth lens unit L5 having positive refractive power, and a sixth lens unit L6 having negative refractive power. During zooming from the wide-angle end to the telephoto end, the first lens unit L1, the third lens unit L3, and the fifth lens unit L5 do not move (i.e., are fixed), the second lens unit L2 moves toward the image side, and the fourth lens unit L4 and the sixth lens unit L6 move toward the object side.

The first lens unit L1 includes four lenses having positive, positive, negative, and positive refractive powers. The second lens unit L2 includes three lenses having negative, negative, and positive refractive powers. Image stabilization is performed by shifting a cemented lens (IS) on the image side in the third lens unit L3.

During focusing from infinity to a close distance, the sixth lens unit L6 moves toward the image side. The aperture stop SP determines the F-number, and is disposed between two cemented lenses in the third lens unit L3.

The zoom lens according to Example 2 illustrated in FIG. 3 includes a first lens unit L1 having positive refractive power, a second lens unit L2 having negative refractive power, a third lens unit L3 having positive refractive power, a fourth lens unit L4 having positive refractive power, a fifth lens unit L5 having positive refractive power, and a sixth lens unit L6 having negative refractive power. During zooming from the wide-angle end to the telephoto end, the first lens unit L1, the third lens unit L3, and the fifth lens unit L5 do not move (i.e., are fixed), the second lens unit L2 moves toward the image side, and the fourth lens unit L4 and the sixth lens unit L6 move toward the object side.

The first lens unit L1 includes three lenses having positive, negative, and positive refractive powers. The second lens unit L2 includes three lenses having negative, negative, and positive refractive powers. Image stabilization is performed by shifting the cemented lens (IS) on the image side in the third lens unit L3. During focusing from infinity to a close distance, the fourth lens unit L4 and the sixth lens unit L6 move toward the image side. The aperture stop SP is disposed between the two cemented lenses in the third lens unit L3.

The zoom lens according to Example 3 illustrated in FIG. 5 includes a first lens unit L1 having positive refractive power, a second lens unit L2 having negative refractive power, a third lens unit L3 having negative refractive power, a fourth lens unit L4 having positive refractive power, a fifth lens unit L5 having positive refractive power, a sixth lens unit L6 having positive refractive power, and a seventh lens unit L7 having negative refractive power. During zooming from the wide-angle end to the telephoto end, the first lens unit L1, the fourth lens unit L4, and the sixth lens unit L6 do not move (i.e., are fixed), the second lens unit L2 and the third lens unit L3 move toward the image side, and the fifth lens unit L5 and the seventh lens unit L7 move toward the object side.

The first lens unit L1 includes three lenses having positive, negative, and positive refractive powers. The second lens unit L2 includes three lenses having negative, negative, and positive refractive powers. Image stabilization is performed by shifting the image-side cemented lens (IS) in the fourth lens unit L4.

During focusing from infinity to a close distance, the fifth lens unit L5 and the seventh lens unit L7 move toward the image side. The aperture stop SP is disposed between the two cemented lenses in the fourth lens unit L4.

The zoom lens according to Example 4 illustrated in FIG. 7 includes a first lens unit L1 having positive refractive power, a second lens unit L2 having negative refractive power, a third lens unit L3 having positive refractive power, a fourth lens unit L4 having positive refractive power, a fifth lens unit L5 having negative refractive power, and a sixth lens unit L6 having positive refractive power. During zooming from the wide-angle end to the telephoto end, the first lens unit L1, the third lens unit L3, and the sixth lens unit L6 do not move (i.e., are fixed), the second lens unit L2 and the fifth lens unit L5 move toward the image side, and the fourth lens unit L4 moves toward the object side.

The first lens unit L1 includes three lenses having negative, positive, and positive refractive powers. The second lens unit L2 includes four lenses having negative, negative, positive, and negative refractive powers. Image stabilization is performed by shifting the third and fourth lenses (IS) from the object side in the third lens unit L3.

During focusing from infinity to a close distance, the fifth lens unit L5 moves toward the image side. The aperture stop SP is disposed closest to the object in the third lens unit L3.

The zoom lens according to Example 5 illustrated in FIG. 9 includes a first lens unit L1 having positive refractive power, a second lens unit L2 having negative refractive power, a third lens unit L3 having positive refractive power, and a fourth lens unit L4 having negative refractive power. During zooming from the wide-angle end to the telephoto end, the first lens unit L1 and the third lens unit L3 do not move (i.e., are fixed), the second lens unit L2 moves toward the image side, and the fourth lens unit L4 moves toward the object side.

The first lens unit L1 includes three lenses having positive, negative, and positive refractive powers. The second lens unit L2 includes four lenses having negative, negative, and positive, negative refractive powers. Image stabilization is performed by shifting a cemented lens (IS) consisting of the third and fourth lenses from the object side in the third lens unit L3.

During focusing from infinity to a close distance, the fourth lens unit L4 moves toward the image side. The aperture stop SP is disposed between the cemented lens closest to the object and the cemented lens disposed on the image side of the cemented lens closest to the object in the third lens unit L3.

The zoom lens according to each example performs zooming by moving the second lens unit L2 and one or more lens units among the two or more subsequent lens units disposed on the image side of the second lens unit L2. The first lens unit L1 includes a plurality of large-diameter glass lenses and accounts for a large portion of the overall weight of the zoom lens, and thus the first lens unit L1 has four or fewer lenses in each example. A cemented lens consisting of two lenses cemented together is counted as two lenses.

The second lens unit L2 as a primary magnification varying unit suppresses the thickness of each lens and sets a large thickness to an air lens so as to satisfactorily correct aberrations even with a lightweight configuration with a small number of lenses. Thereby, fluctuations in spherical aberration and coma associated with zooming can be suppressed.

In each example, the focus lens unit that moves during focusing is a lens unit disposed on the image side of the second lens unit L2 as the primary magnification varying unit. Thereby, changes in image magnification during focusing can be reduced, and changes in the angle of view can be suppressed.

A description will now be given of inequalities that the zoom lens according to each example may satisfy.

The following inequalities (1) and (2) may be satisfied:

$$3.1 \leq D2/TG2 \leq 10.0 \tag{1}$$

$$-20.0 \leq ft/f2 \leq -6.8 \tag{2}$$

where D2 is a thickness on the optical axis from a surface closest to the object of the second lens unit L2 to a surface closest to the image plane of the second lens unit L2, TG2 is a sum of thicknesses on the optical axis from a surface closest to the object of the second lens unit L2 to a surface on the image side of one or more lenses in the second lens unit L2, ft is a focal length of the zoom lens at the telephoto end, and f2 is a focal length of the second lens unit L2.

Inequality (1) defines a proper relationship between the thickness D2 of the second lens unit L2 and the sum TG2 of the thicknesses of the lenses in the second lens unit L2 to achieve aberrational corrections over the entire zoom range and the size and weight reductions of the second lens unit L2 as a moving lens unit. In a case where the thickness D2 of the second lens unit L2 becomes so large that D2/TG2 becomes higher than the upper limit of inequality (1), even if the glass lens weight of the second lens unit L2 is light, the size of the barrel for holding the second lens unit L2 increases. In addition, in order to obtain the desired zoom magnification, a large space is to be secured in the optical axis direction to move the second lens unit L2 and the overall length of the zoom lens cannot be satisfactorily reduced. In a case where the sum TG2 of the thicknesses of the lenses in the second lens unit L2 becomes small so that D2/TG2 becomes higher than the upper limit of inequality (1), each glass lens of the second lens unit L2 is to be extremely thin, and it causes manufacturing difficulties and significant performance degradation due to surface distortion that occurs when the second lens unit L2 is assembled into the barrel.

In a case where the thickness D2 of the second lens unit L2 becomes small so that D2/TG2 becomes lower than the lower limit of inequality (1), the air lens thickness required to correct aberrations with a small number of lenses becomes small, and aberrations (especially spherical aberration and coma at the telephoto end) increase. In a case where the sum TG2 of the thicknesses of the lenses in the second lens unit L2 becomes large so that D2/TG2 becomes lower than the lower limit of inequality (1), the weight of the second lens unit L2 increases, and it becomes difficult to reduce the weight of the moving lens unit.

Inequality (2) defines a proper relationship between the focal length f2 of the second lens unit L2 and the focal length ft of the zoom lens at the telephoto end in order to reduce the size and weight of the second lens unit L2 and the overall length of the zoom lens. In a case where the focal length f2 of the second lens unit L2 is increased so that ft/f2 becomes higher than the upper limit of inequality (2), moving distances of the second lens unit L2 and the subsequent lens unit increase in order to obtain a desired zoom magnification, and the overall length of the zoom lens increases. In a case where the focal length ft of the zoom lens at the telephoto end is reduced so that ft/f2 becomes higher than the upper limit of inequality (2), a desired angle of view at the telephoto end cannot be obtained.

In a case where the focal length f2 of the second lens unit L2 is reduced so that ft/f2 becomes lower than the lower limit of inequality (2), a diameter of a light beam incident on the subsequent lens unit increases, and the lens diameter increases, and the weight reduction of the moving lens unit cannot be achieved. In a case where the refractive power of the second lens unit L2 increases, it becomes difficult to suppress the variation of the curvature of field caused by zooming. In a case where the focal length ft at the telephoto end is increased so that ft/f2 becomes lower than the lower limit of inequality (2), it becomes difficult to correct longitudinal chromatic aberration at the telephoto end while a desired overall length of the zoom lens is maintained.

Inequalities (1) and (2) may be replaced with inequalities (1a) and (2a) below:

$$3.2 \leq D2/TG2 \leq 7.0 \tag{1a}$$

$$-14.0 \leq ft/f2 \leq -6.9 \tag{2a}$$

Inequalities (1) and (2) may be replaced with inequalities (1b) and (2b) below:

$$4.5 \leq D2/TG2 \leq 6.0 \tag{1b}$$

$$-10.0 \leq ft/f2 \leq -7.2 \tag{2b}$$

The above configuration satisfying inequalities (1) and (2) can achieve a positive lead type zoom lens with a long focal length at the telephoto end, well suppressed aberrations, and reduced sizes and weights of the moving lens unit and the zoom lens.

A description will be given of inequalities that may be satisfied by the zoom lens according to each example. In these inequalities, m2 is a moving amount of the second lens unit L2 during zooming from the wide-angle end to the telephoto end. A moving amount of a lens unit corresponds to a difference between the position of the lens unit on the optical axis at the wide-angle end and the position at the telephoto end. A sign of the moving amount is positive in a case where the lens unit is closer to the image plane at the telephoto end than at the wide-angle end, and negative in a case where it is closer to the object at the telephoto end than at the wide-angle end.

f1 is a focal length of the first lens unit L1, and fw is a focal length of the zoom lens at the wide-angle end. β2t is a lateral magnification of the second lens unit L2 at the telephoto end, and β2w is a lateral magnification of the second lens unit L2 at the wide-angle end. vd_2pmin is the smallest Abbe number based on the d-line of at least one positive lens included in the second lens unit L2. TTD is an overall optical length (overall length of the zoom lens) which is a distance on the optical axis from a surface closest to the object of the zoom lens to the image plane, and skw is a back focus at the wide-angle end. The overall optical length is a distance on the optical axis from a lens surface closest to the object to a lens surface (final lens surface) closest to the image plane of the zoom lens plus the back focus. The back focus is an air equivalent length from the final lens surface to the image plane. The optical overall length of the zoom lens according to each example does not change due to zooming.

βist is a lateral magnification of the image stabilizing unit IS at the telephoto end, and βrit is a combined lateral magnification of at least one lens unit disposed on the image side of the correction lens IS at the telephoto end. f1max is a focal length of a positive lens with lowest refractive power among at least one positive lens included in the first lens unit L1.

The zoom lens according to each example may satisfy at least one of the following inequalities (3) to (10):

$$-20.0 \leq ft/m2 \leq -1.0 \tag{3}$$

$$0.5 \leq f1/fw \leq 6.0 \tag{4}$$

$$0.3 \leq m2/f2 \leq 3.0 \tag{5}$$

$$1.0 < \beta 2t/\beta 2w \leq 5.0 \tag{6}$$

$$15.0 \leq \text{vd\_2pmin} \leq 40.0 \tag{7}$$

$$2.0 \leq TTD/skw \leq 15.0 \tag{8}$$

$$0.65 \leq |(1-\beta ist)\beta rit| \leq 2.0 \tag{9}$$

$$1.3 \leq f1max/f1 \leq 7.0 \tag{10}$$

Inequality (3) defines a proper relationship between the moving amount m2 of the second lens unit L2 during zooming and the focal length ft of the zoom lens at the telephoto end in order to reduce the size and weight of the second lens unit L2. In a case where the focal length ft at the telephoto end is increased so that ft/m2 becomes higher than the upper limit of inequality (3), the magnification at the can be secured telephoto end, but it becomes difficult to correct various aberrations, especially longitudinal chromatic aberration, which occur at the telephoto end. In addition, in order to suppress various aberrations at the telephoto end, the overall length of the zoom lens is to be increased and it becomes difficult to reduce the size and weight. In a case where the moving amount m2 of the second lens unit L2 is reduced so that ft/m2 becomes higher than the upper limit of inequality (3), the size and weight of a driving mechanism for the second lens unit L2 are likely to increase, and the refractive power of the second lens unit L2 is to be strengthened to obtain a desired zoom magnification. As a result, it becomes difficult to suppress lateral chromatic aberration at the wide-angle end and spherical aberration and coma that occur at the telephoto end, and optical performance may lower.

In a case where the focal length ft at the telephoto end is reduced so that ft/m2 becomes lower than the lower limit of inequality (3), a desired magnification at the telephoto end cannot be obtained. In a case where the moving amount m2 of the second lens unit L2 is increased so that ft/m2 becomes lower than the lower limit of inequality (3), it becomes difficult to achieve a compact moving lens unit.

Inequality (4) defines a proper relationship between the focal length fw at the wide-angle end and the focal length f1 of the first lens unit L1 to obtain the required zoom magnification. In a case where the focal length f1 of the first lens unit L1 is increased so that f1/fw becomes higher than the upper limit of inequality (4), it is beneficial to lateral chromatic aberration correction at the wide-angle end and longitudinal chromatic aberration correction at the telephoto end. However, the moving amount of the second lens unit L2 during zooming and thus the overall length of the zoom lens increase. In a case where the focal length f1 of the first lens unit L1 decreases so that f1/fw becomes lower than the lower limit of inequality (4), this is beneficial to size reduction, but it becomes difficult to correct spherical aberration and coma using a small number of lenses. The focal length of the zoom lens on the wide-angle side increases, and it becomes difficult to secure the desired zoom magnification.

Inequality (5) defines a proper relationship between the moving amount m2 of the second lens unit L2 and the focal length f2 to achieve the desired zoom magnification and size reduction. In a case where the moving amount m2 of the second lens unit L2 is increased so that m2/f2 becomes lower than the lower limit of inequality (5), a magnification at the telephoto end can be increased, but the size of the drive mechanism for the second lens unit L2 may increase. In a case where the focal length f2 of the second lens unit L2 is reduced so that m2/f2 becomes lower than the lower limit of inequality (5), it is difficult to suppress aberrations occurring in the second lens unit L2, particularly lateral chromatic aberration at the wide-angle end and spherical aberration and coma at the telephoto end. It is also difficult to suppress fluctuations of these aberrations due to zooming.

In a case where the focal length f2 of the second lens unit L2 is increased so that m2/f2 becomes higher than the upper limit of inequality (5), chromatic aberration occurring at the wide-angle end can be suppressed, but for a better telephoto scheme, the second lens unit L2 is to be disposed farther away from the first lens unit L1. As a result, the diameter of the first lens unit L1 increases, and it becomes difficult to reduce the size and weight. In a case where the moving amount m2 of the second lens unit L2 is reduced so that m2/f2 becomes higher than the upper limit of inequality (5), it is difficult to obtain a desired focal length at the telephoto end. In order to obtain the desired focal length at the telephoto end, the moving amount of the subsequent lens unit increases, and it becomes difficult to reduce the size and weight of the moving lens unit.

Inequality (6) defines a proper relationship between the lateral magnifications β2t and β2w of the second lens unit L2 at the telephoto end and wide-angle end, i.e., a proper zoom ratio in order to reduce the overall length and the barrel diameter of the zoom lens. In a case where β2t/β2w becomes higher than the upper limit of inequality (6), this is beneficial to a high magnification and a reduced diameter of the subsequent lens unit, but it becomes difficult to suppress spherical aberration, coma, and longitudinal chromatic aberration that occur in the second lens unit L2. In a case where β2t/β2w becomes lower than the lower limit of inequality (6), the refractive power of the subsequent lens unit or its moving amount during zooming is to be increased in order to obtain the desired zoom magnification, and it becomes difficult to reduce the overall length of the zoom lens and secure the optical performance of the zoom lens.

Inequality (7) defines a proper minimum Abbe number vd_2pmin for satisfactorily correcting chromatic aberration by the positive lens included in the second lens unit L2. In a case where vd_2pmin becomes lower than the lower limit of inequality (7), it is beneficial to longitudinal chromatic aberration correction at the telephoto end, but lateral chromatic aberration at the wide-angle end increases. In a case where vd_2pmin becomes higher than the upper limit of inequality (7), it becomes difficult to correct longitudinal chromatic aberration at the wide-angle end.

Inequality (8) defines a proper relationship between the overall length TTD of the zoom lens and the back focus skw at the wide-angle end to obtain a zoom lens with a short overall length. In a case where the overall length TTD is increased so that TTD/skw becomes higher than the upper limit of inequality (8), it becomes difficult to reduce the overall length. In a case where the back focus skw at the wide-angle end is reduced so that TTD/skw becomes higher than the upper limit of inequality (8), the mechanical layout of the connection between the zoom lens and the camera becomes difficult. In a case where the overall length TTD is reduced so that TTD/skw becomes lower than the lower limit of inequality (5), the positive refractive power of the entire zoom lens becomes too high, and it becomes difficult to control the Petzval sum and obtain desired optical performance. In a case where the back focus skw is increased so that TTD/skw becomes lower than the lower limit of inequality (8), it becomes difficult to reduce the overall length.

Inequality (9) defines a proper relationship between the lateral magnification βist of the image stabilizing unit at the telephoto end and the combined lateral magnification βrt of the lens unit on the image side of the image stabilizing unit at the telephoto end, in order to set a proper shift (decentering) amount of the image stabilizing unit. |(1-βist)βrit| is an image stabilization sensitivity indicating an image displacement amount on the image plane relative to a unit shift amount of the image stabilizing unit at the telephoto end. In a case where | (1-βist)βrit| becomes higher than the upper limit of inequality (9), it is beneficial to the shift amount suppression of the image stabilizing unit and the size reduction of a driving mechanism for the image stabilizing unit. However, due to an excessively large image stabilization sensitivity, if the image stabilizing unit is decentered by manufacturing errors or the like in a situation having no image blur, decentering coma occurs, and it becomes difficult to control a shift amount for image stabilization.

In a case where | (1-βist)βrit| becomes lower than the lower limit of inequality (9), the shift amount of the image stabilizing unit is to be increased in order to obtain a sufficient image stabilizing amount. As a result, the size of the driving mechanism for the image stabilizing unit increases.

Inequality (10) defines a proper relationship between the focal length f1max of the positive lens with the lowest refractive power in the first lens unit L1 and the focal length f1 of the first lens unit L1 in order to reduce the size and weight of the second lens unit L2. In order to reduce the weight of the moving lens unit, it is effective to increase the refractive power of the first lens unit L1 to converge the light rays incident on the second lens unit L2. In other words, it is important to properly set a focal length of each lens in the first lens unit L1 and the focal length of the first lens unit L1.

In a case where the maximum focal length f1max increases so that f1max/f1 becomes higher than the upper limit value of inequality (10), the volume of the lenses in the first lens unit L1 increases, and it becomes difficult to reduce the weight. In a case where the focal length f1 is reduced so that f1max/f1 becomes higher than the upper limit of inequality (10), this is beneficial to weight reduction of the second lens unit L2, but it becomes difficult to suppress various aberrations occurring in the first lens unit L1, particularly lateral chromatic aberration and longitudinal chromatic aberration at the telephoto end.

In a case where f1max is reduced so that f1max/f1 becomes lower than the lower limit of inequality (10), a lens in the first lens unit L1 comes to have extremely strong positive power. As a result, the volume of the first lens unit L1 increases and it becomes difficult to suppress spherical aberration at the telephoto end. In a case where the focal length f1 increases so that f1max/f1 becomes lower than the lower limit of inequality (10), the outer diameter of the second lens unit L2 increases, and it becomes difficult to reduce the weight of the moving lens unit.

Inequalities (3) to (10) may be replaced with inequalities (3a) to (10a) below:

$$-15.0 \le ft/m2 \le -2.0 \quad (3a)$$

$$0.7 \le f1/fw \le 4.0 \quad (4a)$$

$$0.5 \le m2/f2 \le 3.0 \quad (5a)$$

$$1.3 \le \beta 2t/\beta 2w \le 4.0 \quad (6a)$$

$$20.0 \le \mathrm{vd\_2pmin} \le 35.0 \quad (7a)$$

$$2.3 \le TTD/skw \le 12.0 \quad (8a)$$

$$0.7 \le |(1-\beta ist)\beta rit| \le 1.5 \quad (9a)$$

$$1.4 \le f1\mathrm{max}/f1 \le 6.0 \quad (10a)$$

Inequalities (3) to (10) may be replaced with inequalities (3b) to (10b) below:

$$-11.0 \le ft/m2 \le -3.5 \quad (3b)$$

$$0.9 \le f1/fw \le 3.5 \quad (4b)$$

$$0.65 \le m2/f2 \le 2.00 \quad (5b)$$

$$1.5 \le \beta 2t/\beta 2w \le 3.5 \quad (6b)$$

$$22.0 \le \mathrm{vd\_2pmin} \le 28.0 \quad (7b)$$

$$2.5 \le TTD/skw \le 9.0 \quad (8b)$$

$$0.8 \le |(1-\beta ist)\beta rit| \le 1.2 \quad (9b)$$

$$1.6 \le f1\mathrm{max}/f1 \le 5.0 \quad (10b)$$

A description will be given of an illustrative configuration of the zoom lens according to each example. First, the image stabilizing unit IS is set to the whole or part of any of the lens units on the image side of the second lens unit L2 for good image stabilization from the wide-angle end to the telephoto end using the image stabilizing unit having a reduced size and weight. Setting the image stabilizing unit IS to the whole or part of a lens unit that does not move during zooming is beneficial to simplifying the driving mechanism for the image stabilizing unit.

The second lens unit L2 may have strong negative refractive power. For aberrational corrections, the second lens unit L2 may include two or more lenses, and for corrections of chromatic aberration and curvature of field, the second lens unit L2 may include a positive lens as described above.

For size and weight reductions of the second lens unit L2 as a moving lens unit, the second lens unit L2 may include four or fewer lenses, or three or less lenses.

For good corrections of various aberrations throughout the entire zoom range, the subsequent lens unit on the image side of the second lens unit L2 may include three or more lens units.

From size and weight reductions and suppression of changes in image magnification, the lens unit that moves during focusing may be a lens unit disposed on the image side of the second lens unit L2.

In each example, for reductions of the manufacturing cost and manufacturing error, all lenses in each lens unit may be spherical lenses.

By satisfying any one of inequalities (3) to (10) or any one of the above configurations in addition to inequalities (1) and (2), it becomes easier to provide a zoom lens that has a long focal length at the telephoto end, good correction capability of various aberrations, and small and lightweight configurations of the whole and a moving lens unit.

Numerical examples 1 to 5 will be illustrated below. In each numerical example, a surface number i indicates the order of the surface when counted from the object side. r represents a radius of curvature (mm) of an i-th surface counted from the object side, d represents a lens thickness or air gap (mm) between i-th and (i+1)-th surfaces, and nd represents a refractive index for the d-line of the optical material between the i-th and (i+1)-th surfaces. vd represents an Abbe number based on the d-line of the optical material between the i-th and (i+1)-th surfaces. The Abbe number vd based on the d-line is expressed as:

$$vd=(Nd-1)/(NF-NC)$$

where Nd, NF, and NC are refractive indices for d-line (587.6 nm), F-line (486.1 nm), and C-line (656.3 nm) in the Fraunhofer line, respectively.

In each numerical example, d, a focal length (mm), an F-number, and a half angle of view (°) are all values in a case where the optical system according to each numerical example is in focus on an object at infinity. BF represents a back focus (mm), and a value at the wide-angle end corresponds to skw in inequality (8). The overall lens length (mm) corresponds to TTD in inequality (8). WIDE represents a wide-angle end, MIDDLE represents an intermediate zoom position, and TELE represents a telephoto end.

An asterisk "*" next to a surface number means that the surface has an aspheric shape. The aspheric shape is expressed by the following expression:

$$x=(h^2/R)/[1+\{1-(1+K)(h/R)^2\}]^{1/2}+A4\times h^4+A6\times h^6+A8\times h_8+A10\times h^{10}+A12\times h^{12}$$

where x is a displacement amount from a surface vertex in the optical axis direction, h is a height from the optical axis in a direction perpendicular to the optical axis, a light traveling direction is positive, R is a paraxial radius of curvature, K is a conic constant, and A4 to A12 are aspheric coefficients.

"e±XX" in the conic constant and aspheric coefficients means "$\times 10^{\pm XX}$."

Table 1 summarizes the values of inequalities (1) to (10) for each numerical example.

Numerical Example 1

UNIT: mm

SURFACE DATA

| Surface No. | r | d | nd | νd |
|---|---|---|---|---|
| 1 | 94.370 | 3.87 | 1.48749 | 70.2 |
| 2 | 215.944 | 0.15 | | |
| 3 | 77.650 | 4.12 | 1.49700 | 81.5 |
| 4 | 159.044 | 0.15 | | |
| 5 | 42.920 | 1.70 | 1.78880 | 28.4 |
| 6 | 31.986 | 10.99 | 1.49700 | 81.5 |
| 7 | 313.860 | (variable) | | |
| 8 | 138.509 | 0.80 | 1.72916 | 54.7 |
| 9 | 23.206 | 9.97 | | |
| 10 | −47.237 | 0.80 | 1.75500 | 52.3 |
| 11 | 85.045 | 5.53 | | |
| 12 | 79.312 | 2.45 | 1.85896 | 22.7 |
| 13 | −590.720 | (variable) | | |
| 14 | 161.595 | 5.86 | 1.67270 | 32.1 |
| 15 | −31.634 | 1.20 | 1.95375 | 32.3 |
| 16 | −90.849 | 1.33 | | |
| 17 (SP) | ∞ | 1.00 | | |
| 18 | 55.612 | 1.00 | 1.95375 | 32.3 |
| 19 | 35.567 | 6.55 | 1.48749 | 70.2 |
| 20 | −100.046 | (variable) | | |
| 21 | −156.178 | 1.00 | 1.51742 | 52.4 |
| 22 | 44.022 | 6.28 | 1.49700 | 81.5 |
| 23 | −59.792 | (variable) | | |
| 24 | −68.122 | 2.64 | 1.92286 | 20.9 |
| 25 | −44.268 | 0.15 | | |
| 26 | 53.712 | 5.28 | 1.49700 | 81.5 |
| 27 | −39.532 | 1.40 | 2.00100 | 29.1 |
| 28 | 32.214 | 0.15 | | |
| 29 | 32.345 | 5.30 | 1.95375 | 32.3 |
| 30 | −138.302 | (variable) | | |
| 31 | −127.779 | 1.54 | 1.89286 | 20.4 |
| 32 | −72.230 | 1.00 | 1.48749 | 70.2 |
| 33 | 33.296 | (variable) | | |
| Image Plane | ∞ | | | |

VARIOUS DATA
Zoom Ratio 2.64

| | WIDE | MIDDLE | TELE |
|---|---|---|---|
| Focal Length | 73.68 | 132.98 | 194.48 |
| Fno | 4.10 | 4.10 | 4.10 |
| Half Angle of View (°) | 16.36 | 9.24 | 6.35 |
| Image Height | 21.64 | 21.64 | 21.64 |
| Overall Lens Length | 198.01 | 198.01 | 198.01 |
| BF | 49.13 | 56.05 | 65.78 |
| d 7 | 1.47 | 14.57 | 22.17 |
| d13 | 22.24 | 9.13 | 1.53 |
| d20 | 23.80 | 10.31 | 13.02 |
| d23 | 1.44 | 14.93 | 12.21 |
| d30 | 17.73 | 10.80 | 1.07 |
| d33 | 49.13 | 56.05 | 65.78 |

LENS UNIT DATA

| Lens Unit | Starting Surface | Focal Length |
|---|---|---|
| 1 | 1 | 71.26 |
| 2 | 8 | −26.43 |
| 3 | 14 | 69.67 |
| 4 | 21 | 213.48 |
| 5 | 24 | 99.67 |
| 6 | 31 | −62.18 |

Numerical Example 2

UNIT: mm

SURFACE DATA

| Surface No. | r | d | nd | νd |
|---|---|---|---|---|
| 1 | 78.498 | 6.05 | 1.49700 | 81.5 |
| 2 | 799.078 | 0.15 | | |
| 3 | 43.139 | 1.70 | 1.78880 | 28.4 |
| 4 | 32.551 | 10.21 | 1.49700 | 81.5 |
| 5 | 279.702 | (variable) | | |
| 6 | 638.262 | 1.20 | 1.72916 | 54.7 |
| 7 | 25.021 | 8.01 | | |
| 8 | −51.601 | 1.20 | 1.75500 | 52.3 |
| 9 | 88.013 | 3.84 | | |
| 10 | 69.755 | 3.20 | 1.74451 | 24.6 |
| 11 | −216.952 | (variable) | | |
| 12 | 196.035 | 5.74 | 1.67270 | 32.1 |
| 13 | −31.978 | 1.20 | 1.95375 | 32.3 |
| 14 | −88.230 | 3.31 | | |
| 15 (SP) | ∞ | 1.00 | | |
| 16 | 54.506 | 1.00 | 1.95375 | 32.3 |
| 17 | 35.614 | 6.12 | 1.48749 | 70.2 |
| 18 | −115.108 | (variable) | | |
| 19 | −163.757 | 1.00 | 1.51742 | 52.4 |
| 20 | 59.151 | 5.30 | 1.49700 | 81.5 |
| 21 | −63.252 | (variable) | | |
| 22 | −63.413 | 2.44 | 1.92286 | 20.9 |
| 23 | −42.745 | 0.15 | | |
| 24 | 54.734 | 5.19 | 1.49700 | 81.5 |
| 25 | −38.349 | 1.40 | 2.00100 | 29.1 |
| 26 | 34.880 | 0.15 | | |
| 27 | 34.700 | 5.92 | 1.95375 | 32.3 |
| 28 | −122.841 | (variable) | | |
| 29 | −100.615 | 2.19 | 1.89286 | 20.4 |
| 30 | −61.002 | 1.00 | 1.48749 | 70.2 |
| 31 | 33.815 | (variable) | | |
| Image Plane | ∞ | | | |

VARIOUS DATA
Zoom Ratio 2.67

| | WIDE | MIDDLE | TELE |
|---|---|---|---|
| Focal Length | 73.38 | 132.97 | 195.57 |
| Fno | 4.10 | 4.10 | 4.10 |
| Half Angle of View (°) | 16.43 | 9.24 | 6.31 |
| Image Height | 21.64 | 21.64 | 21.64 |
| Overall Lens Length | 198.66 | 198.66 | 198.66 |
| BF | 48.73 | 54.94 | 64.04 |
| d 5 | 1.72 | 15.89 | 24.35 |
| d11 | 24.59 | 10.42 | 1.96 |
| d18 | 19.58 | 5.17 | 9.07 |
| d21 | 7.66 | 22.08 | 18.18 |
| d28 | 17.72 | 11.51 | 2.41 |
| d31 | 48.73 | 54.94 | 64.04 |

LENS UNIT DATA

| Lens Unit | Starting Surface | Focal Length |
|---|---|---|
| 1 | 1 | 74.12 |
| 2 | 6 | −28.07 |
| 3 | 12 | 72.69 |
| 4 | 19 | 223.93 |
| 5 | 22 | 96.32 |
| 6 | 29 | −59.72 |

Numerical Example 3

UNIT: mm

SURFACE DATA

-continued

| UNIT: mm | | | | |
|---|---|---|---|---|
| Surface No. | r | d | nd | νd |
| 1 | 75.230 | 6.69 | 1.49700 | 81.5 |
| 2 | 1013.318 | 0.15 | | |
| 3 | 44.313 | 1.70 | 1.79636 | 29.8 |
| 4 | 33.680 | 10.06 | 1.49700 | 81.5 |
| 5 | 201.714 | (variable) | | |
| 6 | 357.291 | 1.00 | 1.65501 | 58.0 |
| 7 | 29.849 | 16.51 | | |
| 8 | −65.590 | 1.00 | 1.75500 | 52.3 |
| 9 | 56.827 | 5.16 | | |
| 10 | 64.192 | 2.38 | 1.81987 | 22.3 |
| 11 | 419.824 | (variable) | | |
| 12 | 130.103 | 1.30 | 2.00083 | 27.0 |
| 13 | 53.142 | 0.00 | | |
| 14 | 53.142 | 2.13 | 1.80635 | 25.2 |
| 15 | 99.166 | (variable) | | |
| 16 | 152.070 | 5.05 | 1.67270 | 32.1 |
| 17 | −33.586 | 1.20 | 1.95375 | 32.3 |
| 18 | −76.082 | 3.35 | | |
| 19 (SP) | ∞ | 1.00 | | |
| 20 | 51.884 | 1.00 | 1.95375 | 32.3 |
| 21 | 34.848 | 6.05 | 1.48749 | 70.2 |
| 22 | −138.135 | (variable) | | |
| 23 | −615.398 | 1.00 | 1.51742 | 52.4 |
| 24 | 44.713 | 5.92 | 1.49700 | 81.5 |
| 25 | −65.347 | (variable) | | |
| 26 | −83.430 | 2.44 | 1.92286 | 20.9 |
| 27 | −51.954 | 0.15 | | |
| 28 | 54.882 | 5.11 | 1.49700 | 81.5 |
| 29 | −47.453 | 1.40 | 2.00100 | 29.1 |
| 30 | 31.636 | 0.15 | | |
| 31 | 31.905 | 5.16 | 1.95375 | 32.3 |
| 32 | −236.871 | (variable) | | |
| 33 | −84.678 | 1.58 | 1.89286 | 20.4 |
| 34 | −54.880 | 1.00 | 1.48749 | 70.2 |
| 35 | 35.273 | (variable) | | |
| Image Plane | ∞ | | | |

VARIOUS DATA
Zoom Ratio 2.64

| | WIDE | MIDDLE | TELE |
|---|---|---|---|
| Focal Length | 73.63 | 132.99 | 194.38 |
| Fno | 4.10 | 4.10 | 4.10 |
| Half Angle of View (°) | 16.37 | 9.24 | 6.35 |
| Image Height | 21.64 | 21.64 | 21.64 |
| Overall Lens Length | 203.83 | 203.83 | 203.83 |
| BF | 38.72 | 48.25 | 57.64 |
| d 5 | 2.00 | 14.23 | 21.71 |
| d11 | 16.17 | 6.47 | 0.48 |
| d15 | 5.00 | 2.47 | 0.99 |
| d22 | 24.34 | 7.91 | 6.89 |
| d25 | 8.06 | 24.49 | 25.51 |
| d32 | 19.91 | 10.38 | 0.99 |
| d35 | 38.72 | 48.25 | 57.64 |

LENS UNIT DATA

| Lens Unit | Starting Surface | Focal Length |
|---|---|---|
| 1 | 1 | 76.62 |
| 2 | 6 | −27.90 |
| 3 | 12 | −249.96 |
| 4 | 16 | 60.16 |
| 5 | 23 | 157.45 |
| 6 | 26 | 121.95 |
| 7 | 33 | −58.61 |

Numerical Example 4

UNIT: mm

SURFACE DATA

| Surface No. | r | d | nd | νd |
|---|---|---|---|---|
| 1 | 47.238 | 1.50 | 1.94593 | 18.0 |
| 2 | 38.273 | 11.17 | 1.52290 | 77.3 |
| 3 | 113.206 | 0.16 | | |
| 4 | 41.159 | 6.82 | 1.68323 | 58.3 |
| 5 | 137.188 | (variable) | | |
| 6 | 88.705 | 0.54 | 1.88300 | 40.8 |
| 7 | 13.931 | 7.01 | | |
| 8 | −72.031 | 0.50 | 1.50714 | 79.8 |
| 9 | 13.174 | 3.48 | 1.85045 | 23.9 |
| 10 | 58.614 | 4.27 | | |
| 11 | −22.106 | 0.50 | 1.71878 | 55.5 |
| 12 | 35.974 | (variable) | | |
| 13 (SP) | ∞ | 0.50 | | |
| 14 | 15.376 | 0.95 | 1.74392 | 52.9 |
| 15 | 11.785 | 3.99 | 1.52498 | 76.2 |
| 16 | −133.417 | 0.46 | | |
| 17* | 50.446 | 2.07 | 1.58313 | 59.4 |
| 18* | −258.104 | 0.15 | | |
| 19 | −66.550 | 1.00 | 2.00069 | 25.5 |
| 20 | −59.410 | 0.50 | | |
| 21 | 39.258 | 0.70 | 1.54072 | 47.2 |
| 22 | 22.245 | (variable) | | |
| 23* | 41.016 | 5.13 | 1.49700 | 81.5 |
| 24 | −10.563 | 0.98 | 1.87400 | 35.3 |
| 25 | −30.758 | 0.91 | | |
| 26 | 96.388 | 5.76 | 1.58313 | 59.4 |
| 27* | −15.980 | (variable) | | |
| 28 | −292.300 | 1.62 | 1.94594 | 18.0 |
| 29 | −40.135 | 0.27 | | |
| 30 | −30.784 | 0.75 | 1.88300 | 40.8 |
| 31 | 22.904 | (variable) | | |
| 32 | 74.108 | 6.52 | 1.60203 | 66.7 |
| 33 | −29.576 | 0.15 | | |
| 34 | −69.016 | 1.20 | 1.89286 | 20.4 |
| 35 | −127.838 | (variable) | | |
| Image Plane | ∞ | | | |

ASPHERIC DATA

17th Surface
K = 0.00000e+00 A 4 = −8.29802e−05 A 6 = −1.44570e−07
A 8 = −1.37689e−09 A10 = 1.18506e−10
18th Surface
K = 0.00000e+00 A 4 = −6.29971e−05 A 6 = 5.51771e−08
A 8 = −1.54404e−09 A10 = 1.16279e−10
23rd Surface
K = 0.00000e+00 A 4 = −4.12727e−05 A 6 = 1.28381e−08 A 8 = 1.06216e−09 A10 = −6.82156e−12
27th Surface
K = 0.00000e+00 A 4 = 2.67715e−05 A 6 = 5.01729e−09 A 8 = 4.74863e−10 A10 = 1.61250e−12 A12 = −1.69264e−14

VARIOUS DATA
Zoom Ratio 2.81

| | WIDE | MIDDLE | TELE |
|---|---|---|---|
| Focal Length | 18.54 | 28.08 | 52.02 |
| Fno | 4.10 | 4.10 | 4.10 |
| Half Angle of View (°) | 33.06 | 25.43 | 14.50 |
| Image Height | 13.66 | 13.66 | 13.66 |
| Overall Lens Length | 130.47 | 130.47 | 130.47 |
| BF | 14.72 | 14.72 | 14.72 |
| d 5 | 1.77 | 8.62 | 15.46 |
| d12 | 15.99 | 9.15 | 2.31 |
| d22 | 8.91 | 6.25 | 1.50 |
| d27 | 0.94 | 5.57 | 14.63 |
| d31 | 18.59 | 16.62 | 12.31 |
| d35 | 14.72 | 14.72 | 14.72 |

LENS UNIT DATA

-continued

| UNIT: mm | | |
|---|---|---|
| Lens Unit | Starting Surface | Focal Length |
| 1 | 1 | 62.65 |
| 2 | 6 | −7.44 |
| 3 | 13 | 25.32 |
| 4 | 23 | 22.21 |
| 5 | 28 | −21.38 |
| 6 | 32 | 45.44 |

Numerical Example 5

UNIT: mm

SURFACE DATA

| Surface No. | r | d | nd | νd |
|---|---|---|---|---|
| 1 | 161.253 | 5.82 | 1.49700 | 81.5 |
| 2 | −320.813 | 0.20 | | |
| 3 | 53.948 | 1.70 | 1.72825 | 28.5 |
| 4 | 39.505 | 11.98 | 1.49700 | 81.5 |
| 5 | 275.101 | (variable) | | |
| 6 | 3664.345 | 0.80 | 1.69680 | 55.5 |
| 7 | 30.724 | 10.43 | | |
| 8 | −49.316 | 0.70 | 1.49700 | 81.5 |
| 9 | 72.002 | 3.59 | | |
| 10 | 53.349 | 3.89 | 1.71338 | 26.0 |
| 11 | −98.322 | 0.70 | 1.85144 | 40.8 |
| 12 | 137.147 | (variable) | | |
| 13 | 84.795 | 3.68 | 1.76200 | 40.1 |
| 14 | −68.920 | 1.20 | 1.96300 | 24.1 |
| 15 | −211.479 | 1.40 | | |
| 16 (SP) | ∞ | 1.00 | | |
| 17 | 55.767 | 1.00 | 1.86300 | 41.5 |
| 18 | 32.325 | 5.50 | 1.49700 | 81.5 |
| 19 | −81.243 | 2.21 | | |
| 20 | −50.125 | 1.30 | 1.59349 | 67.0 |
| 21 | −150.536 | 25.76 | | |
| 22 | 282.520 | 2.93 | 1.83481 | 42.7 |
| 23 | −63.197 | 0.15 | | |
| 24 | 62.805 | 5.93 | 1.49700 | 81.5 |
| 25 | −50.191 | 1.40 | 2.00100 | 29.1 |
| 26 | −785.392 | (variable) | | |
| 27 | 152.251 | 1.26 | 1.95906 | 17.5 |
| 28 | 249.861 | 1.00 | 1.48749 | 70.2 |
| 29 | 32.261 | (variable) | | |
| Image Plane | ∞ | | | |

-continued

UNIT: mm

VARIOUS DATA
Zoom Ratio 2.67

| | WIDE | MIDDLE | TELE |
|---|---|---|---|
| Focal Length | 73.00 | 109.97 | 194.70 |
| Fno | 4.10 | 4.10 | 4.10 |
| Half Angle of View (°) | 16.51 | 11.13 | 6.34 |
| Image Height | 21.64 | 21.64 | 21.64 |
| Overall Lens Length | 208.80 | 208.80 | 208.80 |
| BF | 73.57 | 69.32 | 75.78 |
| d 5 | 6.41 | 19.33 | 34.28 |
| d12 | 27.93 | 15.01 | 0.05 |
| d26 | 5.37 | 9.61 | 3.15 |
| d29 | 73.57 | 69.32 | 75.78 |

LENS UNIT DATA

| Lens Unit | Starting Surface | Focal Length |
|---|---|---|
| 1 | 1 | 93.56 |
| 2 | 6 | −27.82 |
| 3 | 13 | 46.71 |
| 4 | 27 | −94.47 |

| | Inequality | Example 1 | Example 2 | Example 3 | Example 4 | Example 5 |
|---|---|---|---|---|---|---|
| (1) | 3.1 < D2/TG2 < 10 | 4.827 | 3.114 | 5.951 | 3.248 | 3.300 |
| (2) | −20.0 < ft/f2 < −6.8 | −7.360 | −6.966 | −6.966 | −6.994 | −6.999 |
| (3) | −20.0 < ft/m2 < −1.0 | −9.394 | −8.642 | −9.862 | −3.801 | −6.985 |
| (4) | 0.5 < f1/fw < 6.0 | 0.967 | 1.010 | 1.041 | 3.379 | 1.282 |
| (5) | 0.3 < m2/f2 < 3.0 | 0.783 | 0.806 | 0.706 | 1.840 | 1.002 |
| (6) | 1.0 < β2t/β2w < 5.0 | 3.391 | 3.297 | 2.935 | 1.570 | 2.762 |
| (7) | 15.0 < νd_2pmin < 40.0 | 22.730 | 24.578 | 22.253 | 23.937 | 26.040 |
| (8) | 2.0 < TID/skw < 15.0 | 4.031 | 4.077 | 5.264 | 8.866 | 2.838 |
| (9) | 0.65 < \|(1 − βist)βrit\| < 2.0 | 1.031 | 1.041 | 1.045 | 0.811 | 1.098 |
| (10) | 1.3 < f1max/f1 < 7.0 | 4.775 | 2.356 | 2.129 | 1.679 | 2.317 |
| | D2 | 19.550 | 17.448 | 26.050 | 16.294 | 20.104 |
| | TG2 | 4.050 | 5.603 | 4.378 | 5.016 | 6.093 |
| | ft | 194.483 | 195.568 | 194.382 | 52.015 | 194.699 |
| | f2 | −26.426 | −28.075 | −27.905 | −7.437 | −27.818 |
| | m2 | −20.703 | −22.629 | −19.710 | −13.684 | −27.875 |
| | f1 | 71.261 | 74.120 | 76.620 | 62.649 | 93.559 |
| | fw | 73.677 | 73.378 | 73.635 | 18.543 | 73.004 |

-continued

| Inequality | Example 1 | 2 | 3 | 4 | 5 |
|---|---|---|---|---|---|
| β2t | −3.052 | −2.850 | −2.740 | −0.310 | −1.758 |
| β2w | −0.900 | −0.864 | −0.933 | −0.197 | −0.637 |
| TTD | 198.011 | 198.659 | 203.828 | 130.470 | 208.802 |
| skw | 49.128 | 48.731 | 38.722 | 14.716 | 73.570 |
| βist | −0.292 | −0.366 | −0.559 | 4.002 | −0.048 |
| βrit | 0.798 | 0.762 | 0.670 | −0.270 | 1.048 |
| f1max | 340.300 | 174.663 | 163.121 | 105.191 | 216.792 |

Image Pickup Apparatus

Figure 11:
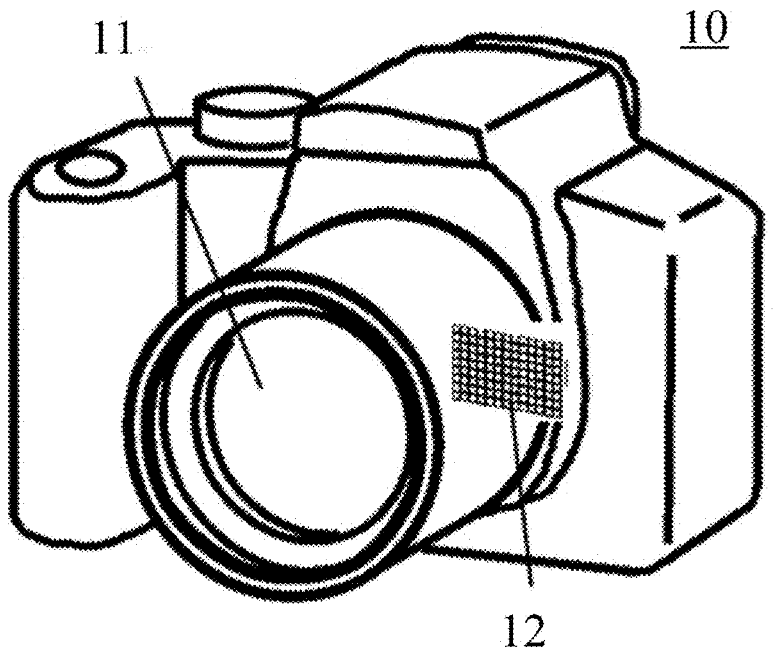
FIG. 11 is a schematic diagram of an image pickup apparatus using the zoom lenses according to any one of Examples 1 to 5.

FIG. 11 illustrates a digital still camera (image pickup apparatus) using the zoom lens according to any one of Examples 1 to 5. In FIG. 11, reference numeral 10 denotes a camera body, and reference numeral 11 denotes an imaging optical system that includes one of the zoom lenses according to Examples 1 to 5. Reference numeral 12 denotes an image sensor (photoelectric conversion element) such as a CCD sensor or CMOS sensor that is built into the camera body 10 and receives an optical image formed by the imaging optical system 11 and performs photoelectric conversion (captures an object). The camera body 10 may be a single-lens reflex camera with a quick-turn mirror, or a mirrorless camera having no quick-turn mirror. The camera body 10 may be a lens interchangeable type camera with a detachable imaging optical system, or a lens integrated type camera with an integrated imaging optical system.

Using the zoom lens according to each example for an image pickup apparatus such as a digital still camera can provide an image pickup apparatus that has a reduced size and weight, and can obtain high-quality images.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each example can provide a positive lead type zoom lens that has a reduced size and weight, and a long focal length at the telephoto end, and can satisfactorily suppress various aberrations.

This application claims priority to Japanese Patent Application No. 2023-195626, which was filed on Nov. 17, 2023, and which is hereby incorporated by reference herein in its entirety.

What is claimed is:

1. A zoom lens comprising, in order from an object side to an image side:

a first lens unit having positive refractive power that does not move during zooming;

a second lens unit having negative refractive power that moves during zooming; and a subsequent lens group including one or more lens units, wherein a distance between adjacent lens units changes during zooming, wherein the first lens unit includes four or fewer lenses, and wherein the following inequalities are satisfied:

$$3.1 \leq D2/TG2 \leq 10$$

-continued $$-20.0 \leq ft/f2 \leq -6.8$$

where D2 is a thickness on an optical axis from a surface closest to an object of the second lens unit to a surface closest to an image plane of the second lens unit, TG2 is a sum of thicknesses on the optical axis from a surface closest to the object of one or more lenses included in the second lens unit to a surface closest to the image plane of the one or more lenses included in the second lens unit, ft is a focal length of the zoom lens at a telephoto end, and f2 is a focal length of the second lens unit.

2. The zoom lens according to claim 1, wherein a sign of a moving amount of the second lens unit is positive in a case where the second lens unit is closer to the image plane at the telephoto end than at a wide-angle end, and wherein the following inequality is satisfied:

$$-20.0 \leq ft/m2 \leq -1.0$$

where m2 is the moving amount of the second lens unit during zooming from the wide-angle end to the telephoto end.

3. The zoom lens according to claim 1, wherein the following inequality is satisfied:

$$0.5 \leq f1/fw \leq 6.0$$

where f1 is a focal length of the first lens unit, and fw is a focal length of the zoom lens at a wide-angle end.

4. The zoom lens according to claim 1, wherein a sign of a moving amount of the second lens unit is positive in a case where the second lens unit is closer to the image plane at the telephoto end than at a wide-angle end, and wherein the following inequality is satisfied:

$$0.3 \leq m2/f2 \leq 3.0$$

where m2 is the moving amount of the second lens unit during zooming from the wide-angle end to the telephoto end.

5. The zoom lens according to claim 1, wherein the following inequality is satisfied:

$$1.0 < \beta 2t/\beta 2w \leq 5.0$$

where $\beta 2t$ is a lateral magnification of the second lens unit at the telephoto end, and $\beta 2w$ is a lateral magnification of the second lens unit at a wide-angle end.

6. The zoom lens according to claim 1, wherein the following inequality is satisfied:

$$15.0 \leq vd\_2pmin \leq 40.0$$

where vd_2pmin is a smallest Abbe number based on d-line of at least one positive lens included in the second lens unit.

7. The zoom lens according to claim 1, wherein the following inequality is satisfied:

$$2.0 \leq TTD/skw \leq 15.0$$

where TTD is a distance from a surface closest to the object of the zoom lens to the image plane, and skw is a back focus of the zoom lens at a wide-angle end.

8. The zoom lens according to claim 1, further comprising an image stabilizing unit configured to move relative to the optical axis for image stabilization, and disposed on the image side of the second lens unit.

9. The zoom lens according to claim 8, wherein the following inequality is satisfied:

$$0.65 \leq |(1-\beta ist)\beta rit| \leq 2.0$$

where $\beta ist$ is a lateral magnification of the image stabilizing unit at the telephoto end, and $\beta rit$ is a combined lateral magnification of at least one lens unit disposed on the image side of the image stabilizing unit at the telephoto end.

10. The zoom lens according to claim 1, wherein the following inequality is satisfied:

$$1.3 \leq f1max/f1 \leq 7.0$$

where f1max is a focal length of a positive lens having lowest refractive power among at least one positive lens included in the first lens unit, and f1 is a focal length of the first lens unit.

11. The zoom lens according to claim 1, wherein the second lens unit includes four or fewer lenses.

12. The zoom lens according to claim 1, wherein the subsequent lens group includes three or more lens units.

13. The zoom lens according to claim 1, wherein a lens unit disposed on the image side of the second lens unit moves during focusing.

14. The zoom lens according to claim 1, wherein the subsequent lens group includes, in order from the object side to the image side, a third lens unit having positive refractive power, and a fourth lens unit having positive refractive power.

15. The zoom lens according to claim 14, wherein the subsequent lens group includes, in order from the object side to the image side, the third lens unit, the fourth lens unit, a fifth lens unit having positive refractive power, and a sixth lens unit having negative refractive power.

16. The zoom lens according to claim 14, wherein the subsequent lens group includes, in order from the object side to the image side, the third lens unit, the fourth lens unit, a fifth lens unit having negative refractive power, and a sixth lens unit having positive refractive power.

17. The zoom lens according to claim 1, wherein the subsequent lens group includes, in order from the object side to the image side, a third lens unit having negative refractive power, and a fourth lens unit having positive refractive power.

18. The zoom lens according to claim 17, wherein the subsequent lens group includes, in order from the object side to the image side, the third lens unit, the fourth lens unit, a fifth lens unit having positive refractive power, a sixth lens unit having positive refractive power, and a seventh lens unit having negative refractive power.

19. The zoom lens according to claim 1, wherein the subsequent lens group includes, in order from the object side to the image side, a third lens unit having positive refractive power and a fourth lens unit having negative refractive power.

20. An image pickup apparatus comprising:

a zoom lens; and an image sensor configured to image an object via the zoom lens, wherein the zoom lens includes, in order from an object side to an image side:

a first lens unit having positive refractive power that does not move during zooming;

a second lens unit having negative refractive power that moves during zooming; and a subsequent lens group including one or more lens units, wherein a distance between adjacent lens units changes during zooming, wherein the first lens unit includes four or fewer lenses, and wherein the following inequalities are satisfied:

$$3.1 \leq D2/TG2 \leq 10$$

$$-20.0 \leq ft/f2 \leq -6.8$$

where D2 is a thickness on an optical axis from a surface closest to the object of the second lens unit to a surface closest to an image plane of the second lens unit, TG2 is a sum of thicknesses on the optical axis from a surface closest to the object of one or more lenses included in the second lens unit to a surface closest to the image plane of the one or more lenses included in the second lens unit, ft is a focal length of the zoom lens at a telephoto end, and f2 is a focal length of the second lens unit.

* * * * *